(12) United States Patent
Hillis et al.

(10) Patent No.: US 12,475,795 B2
(45) Date of Patent: Nov. 18, 2025

(54) DYNAMIC MATCHING OF PROVIDER DEVICES AND REQUESTER DEVICES BASED ON EVENT-TRIGGER REQUESTS

(71) Applicant: Lyft, Inc., San Francisco, CA (US)

(72) Inventors: Alexander James Hillis, Belmont, CA (US); James Nicholas De Angelis, San Francisco, CA (US); Ying Jie Ding, Brooklyn, NY (US); Shashwati Shradha, San Francisco, CA (US)

(73) Assignee: Lyft, Inc., San Francisco, CA (US)

( * ) Notice: Subject to any disclaimer, the term of this patent is extended or adjusted under 35 U.S.C. 154(b) by 0 days.

(21) Appl. No.: 18/194,095

(22) Filed: Mar. 31, 2023

(65) Prior Publication Data

US 2024/0331548 A1 Oct. 3, 2024

(51) Int. Cl.
*G08G 1/00* (2006.01)
*G06Q 10/02* (2012.01)
*G06Q 10/0631* (2023.01)
*G06Q 50/40* (2024.01)
(Continued)

(52) U.S. Cl.
CPC ............. *G08G 1/202* (2013.01); *G06Q 10/02* (2013.01); *G06Q 10/06315* (2013.01); *G06Q 50/40* (2024.01); *H04W 4/021* (2013.01); *H04W 4/029* (2018.02)

(58) Field of Classification Search
CPC .... G06Q 10/02; G06Q 50/40; G01C 21/3453; G01C 21/3438; G08G 1/205
See application file for complete search history.

(56) References Cited

U.S. PATENT DOCUMENTS 10,685,416 B2 * 6/2020 Tolkin ................ G01C 21/3438
2019/0164432 A1 * 5/2019 Quitoriano ............ G08G 1/205
2019/0340544 A1 * 11/2019 Jaffe ...................... G06Q 50/40
(Continued)

FOREIGN PATENT DOCUMENTS

KR 10-2020-014977 A 2/2020

OTHER PUBLICATIONS

International Search Report and Written Opinion as received in PCT/US2024/022022 dated Jul. 10, 2024.

*Primary Examiner* — Yuri Kan
(74) *Attorney, Agent, or Firm* — Keller Preece PLLC

(57) ABSTRACT

This disclosure describes one or more embodiments of methods, non-transitory computer-readable media, and systems that utilize computing models to intelligently match provider devices and requester devices in response to event-trigger transportation requests. In particular, in one or more embodiments, the disclosed systems utilize global positioning information to monitor requester device proximity to pickup locations and generate timely transportation matches for event-trigger transportation requests. For example, the event-trigger transportation matching system matches requester devices and provider devices based on the satisfaction of a location trigger; or, conversely, the event-trigger transportation matching system delays matching processes for provider devices based on a location trigger remaining unsatisfied. Indeed, based on the requester device satisfying a threshold ETA and/or a geofence location trigger, the event-trigger transportation matching system utilizes dynamic approaches to match requester devices with provider devices.

20 Claims, 13 Drawing Sheets

(51) Int. Cl.
*H04W 4/021* (2018.01)
*H04W 4/029* (2018.01)

(56) References Cited

U.S. PATENT DOCUMENTS

| | | | |
|---|---|---|---|
| 2020/0005557 A1* | 1/2020 | Madaan | G06Q 50/40 |
| 2020/0272948 A1* | 8/2020 | Meyer | G06Q 10/02 |
| 2024/0263951 A1* | 8/2024 | Breudecheck | G01C 21/3453 |

* cited by examiner

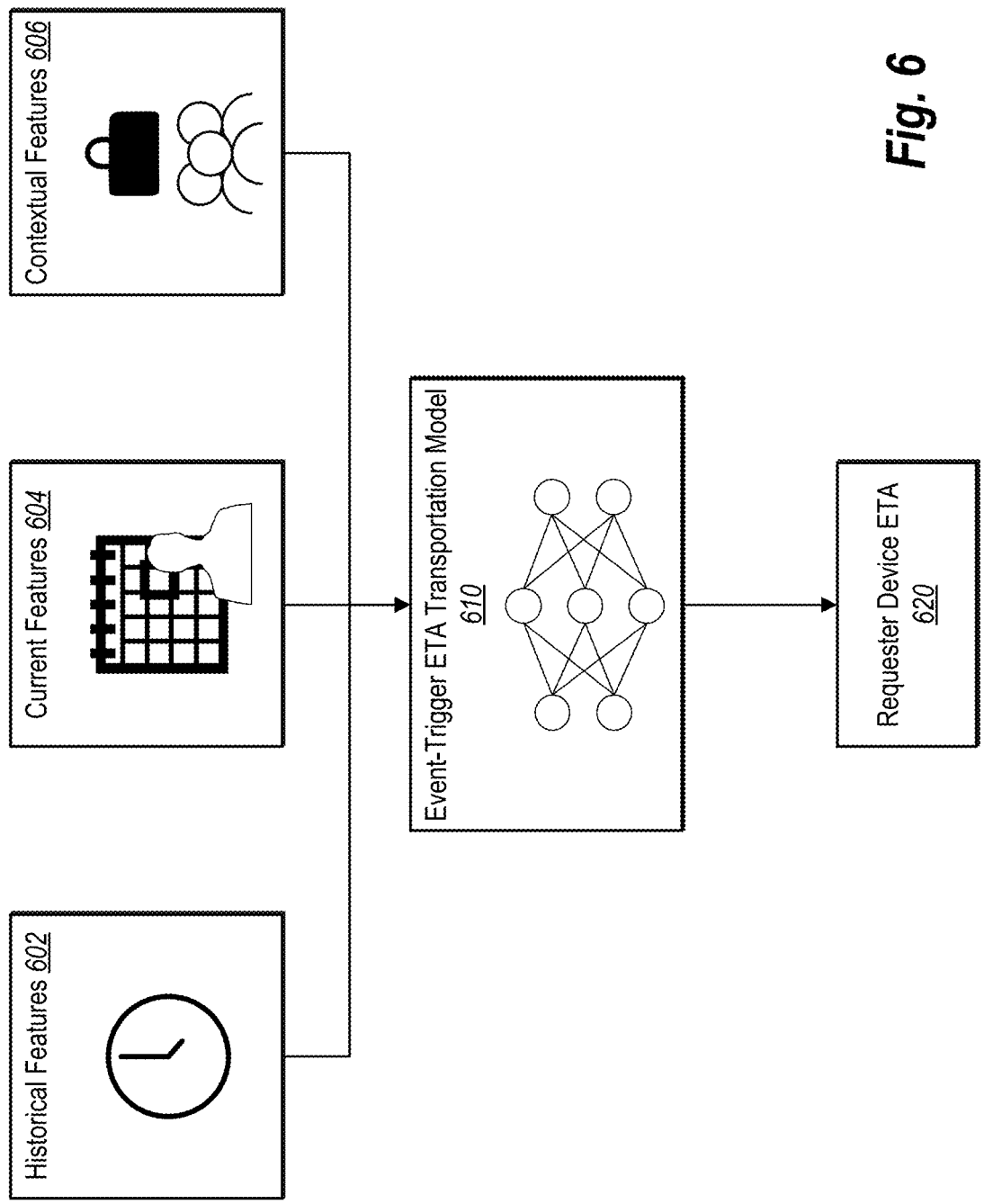

DYNAMIC MATCHING OF PROVIDER DEVICES AND REQUESTER DEVICES BASED ON EVENT-TRIGGER REQUESTS

BACKGROUND

Recent years have seen significant developments in on-demand transportation systems that utilize mobile devices to coordinate across computer networks. Indeed, the proliferation of web and mobile applications has enabled requesting devices to utilize on-demand ride sharing systems to identify matches between provider devices and requester devices and coordinate across computer networks to initiate transportation from one geographic location to another. For instance, conventional transportation network systems can determine geographic locations of provider devices and requester devices, generate digital matches between provider devices and requester devices, and further track, analyze, and manage pick-up, transportation, and drop-off routines through digital transmissions across computer networks. Despite these recent advances, however, conventional transportation network systems continue to exhibit a number of drawbacks and deficiencies, particularly with regard to anticipating and generating future matches between requester devices and provider devices.

For example, conventional systems and implementing computing devices suffer from significant operational inefficiency and accuracy problems with regard to future matches between requester devices and provider devices. Indeed, conventional systems often inaccurately forecast requester devices and provider devices which undermines the equilibrium between the number of requester devices and the number of provider devices within a computer network. Indeed, network imbalances make implementing computing devices inefficient and wastes significant computational resources in communicating with, managing, and matching requester/provider devices (e.g., without a sufficient number of counterpart provider/requester devices). Unfortunately, conventional systems often inaccurately predict and manage provider devices and requester devices. For example, a sudden surge in requester devices in a particular area may occur due to an unexpected event, which can be challenging for conventional systems to accommodate. Rideshare providers may face technical limitations in some locations, such as requester device connectivity issues due to overloaded communication networks at events, that make it difficult to coordinate and anticipate rideshare requests. Due to these difficulties, rideshare providers often inaccurately manage devices across the computer network which can lead to network congestion, utilization of unnecessary resources, and slow response times.

To elaborate, conventional systems often generate inefficient matches that require significant and increased communications between devices over computer networks. To illustrate, conventional systems have difficulty accurately anticipating requester/provider devices based upon upcoming events. Accordingly, conventional systems that inaccurately manage these devices across the computer network often generate matches that require significant re-routing instructions from provider devices and requester devices to route provider devices to locations inefficiently. Moreover, conventional systems often experience increased cancellation requests (or redundant requests), which result in duplicative server matching processes, duplicative instructions to client devices, and duplicative notifications to both provider devices and requester devices. Accordingly, conventional systems suffer from inefficient utilization of computing resources (e.g., memory and processing power), excessive bandwidth utilization, and increased latency.

These technical problems also undermine the flexibility and functional capacity of conventional systems. For example, conventional systems often generate transportation matches in a rigid/reactive fashion and therefore often do not manage provider devices across a network in an efficient or timely manner. To illustrate, many conventional systems utilize the same time-based matching system regardless of location of the requester device or device imbalances between available provider devices and requester devices. This rigid approach, however, undermines the flexibility of implementing systems to provide more adaptable operational control across provider devices and requester devices.

These, along with additional problems and issues, exist with conventional transportation network systems.

SUMMARY

This disclosure describes one or more embodiments of methods, non-transitory computer-readable media, and systems that utilize computing models to proactively and intelligently match provider devices and requester devices in response to event-trigger transportation requests that allow requester devices to dynamically and accurately arrange for provider devices at a future time. In particular, in one or more embodiments, the disclosed systems provide user interfaces that allow requester devices to initiate event-trigger transportation requests comprising a future trigger for arranging a match with a provider computing device. The disclosed systems can utilize global positioning information to monitor requester device proximity and generate timely transportation matches for event-trigger transportation requests. Indeed, based on the requester device satisfying a threshold ETA and/or a geofence location trigger, the systems utilize dynamic approaches to match requester devices with provider devices. In one or more implementations, the disclosed systems utilize event-trigger transportation requests to intelligently and efficiently manage provider devices to improve the balance of provider devices and requester devices. In this manner, the systems are guided by strategically selected global positioning data, geofence location triggers, threshold ETAs, and/or other contextual features to generate efficient, accurate, flexible, and timely transportation matches for requester devices that submit event-trigger transportation requests.

BRIEF DESCRIPTION OF THE DRAWINGS

The detailed description refers to the drawings briefly described below.

FIG. 6 illustrates utilizing an event-trigger ETA transportation model to determine a requester device ETA in accordance with one or more embodiments.

DETAILED DESCRIPTION

Figure 1:
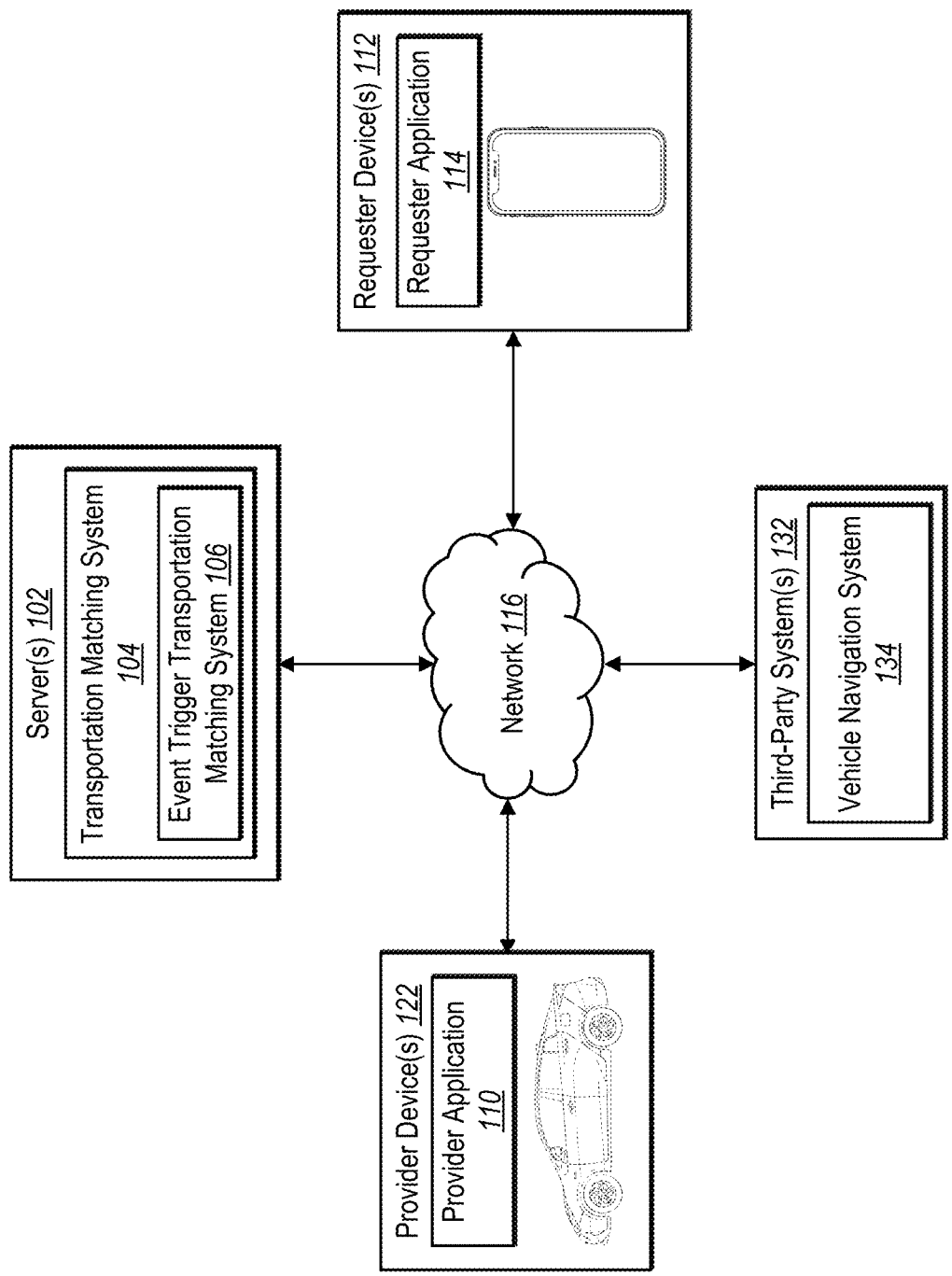
FIG. 1 illustrates a block diagram of an environment for implementing an event-trigger transportation matching system in accordance with one or more embodiments.

This disclosure describes one or more embodiments of an event-trigger transportation matching system that utilizes computing models to proactively and intelligently match provider devices with requester devices based on event-trigger transportation requests. In particular, in one or more embodiments the event-trigger transportation matching system provides customized user interfaces to requester devices to initiate event-trigger transportation requests to coordinate with provider devices at a future time. In response to receiving an event-trigger transportation request, the event-trigger transportation matching system utilizes a variety of intelligent approaches to generate event-trigger transportation matches for the transportation requests. Indeed, the event-trigger transportation matching system can associate an event-trigger transportation request with a future event. Moreover, the event-trigger transportation matching system can determine a trigger corresponding to the future event to generate a match with a provider computing device. For instance, the event-trigger transportation system can utilize global positioning data to determine satisfaction of a location trigger corresponding to an event and generate a transportation match with a provider computing device. The event-trigger transportation matching system, thus, utilizes the location trigger to timely, flexibly, efficiently, and accurately generate transportation matches based on the completion of an upcoming event corresponding to an event-trigger transportation request.

Indeed, in one or more implementations, the event-trigger transportation matching system proactively matches event-trigger transportation requests of requester devices with provider devices based on the satisfaction of a location trigger and/or delays matching processes for provider devices based on a location trigger remaining unsatisfied. For instance, based on a requester device satisfying a threshold ETA and/or a geofence location trigger, the event-trigger transportation matching system utilizes dynamic approaches to match requester devices with provider devices. In some implementations, the event-trigger transportation matching system pre-dispatches provider devices to satisfy upcoming transportation requests based on the balance of provider devices and requester devices. In this manner, the event-trigger transportation matching system is guided by strategically selected global positioning data, geofence location triggers, threshold ETAs, and other reservation guidelines to generate timely transportation matches.

To illustrate, in one or more embodiments, the event-trigger transportation matching system receives an event-trigger transportation request comprising a pickup location corresponding to a future event. To seamlessly satisfy the event-trigger transportation request, the event-trigger transportation matching system utilizes global positioning data to determine that the requester device satisfies a location trigger corresponding to the pickup location. Based on determining the requester device satisfies the location trigger, the event-trigger transportation matching system matches the event-trigger transportation request to a provider device from a pool of available provider devices. Additionally, the event-trigger transportation matching system reserves and dispatches the provider device such that, in response to receiving the event-trigger transportation request, the event-trigger transportation matching system dynamically provides a timely event-trigger transportation match. To illustrate, in one or more embodiments, the event-trigger transportation matching system determines an insufficient number of available provider devices from the pool of available provider devices within a pickup location threshold, and pre-dispatches one or more provider devices based on the event-trigger transportation request and the number of available provider devices. In one or more embodiments, the event-trigger transportation matching system determines a sufficient number of available provider devices from the pool of available provider devices within a pickup location threshold and reserves a provider device for the event-trigger transportation request.

The event-trigger transportation matching system can utilize a variety of approaches to generate transportation matches for event-trigger transportation requests. For example, in one or more embodiments, the event-trigger transportation matching system identifies a future event based on the requester device location and/or the pickup location. The event-trigger transportation matching system can determine a future event based on contextual information and/or accept user input to associate an event-trigger transportation request with a future event. The event-trigger transportation matching system can provide a future event indicator for display via a graphical user interface of the requester device.

Additionally, in one or more embodiments, the event-trigger transportation matching system generates a transportation match by determining a geofence boundary around the pickup location and determining the requester device satisfies the location trigger. The event-trigger transportation matching system can determine, based on the GPS information of the requester device, the requester device is within a threshold distance of the geofence boundary. Further, in one or more embodiments, the event-trigger transportation matching system generates a transportation match by and determining the requester device satisfies the location trigger by determining the requester device ETA to the pickup location, based on a current location of the requester device and contextual transportation features corresponding to the event-trigger transportation request.

Moreover, the event-trigger transportation matching system can determine the number of provider devices in a pool of available provider devices corresponding to the pickup location and select the location trigger from a plurality of location triggers based on the number of provider devices. For example, the event-trigger transportation matching system can determine a provider device requester device balance metric corresponding to the pickup location and select a requester device ETA as the location trigger based on the provider device requester device balance metric. For example, the event-trigger transportation matching system can determine a provider device requester device balance metric corresponding to the pickup location and select a geofence boundary trigger as the location trigger based on the provider device requester device balance metric.

As suggested above, the disclosed event-trigger transportation matching system provides several technical improvements or advantages over conventional systems. For instance, the event-trigger transportation matching system can improve accuracy, efficiency, and operational performance relative to conventional systems. Indeed, unlike conventional systems that struggle to identify and generate matches outside of time-based scheduling, the event-trigger transportation matching system can utilize global positioning data and location triggers to provide more accurate and timely event-trigger transportation matches. For example, the event-trigger transportation matching system can more accurately predict requester devices associated with events by accepting event-trigger transportation requests in advance of future events, utilizing global positioning data to determine requester device arrival associated with completion of future events, and appropriately allocating provider devices based on the satisfaction of a location trigger.

Indeed, the event-trigger transportation matching system can more accurately manage the provider devices across network areas associated with pickup locations. For instance, based on receiving anticipatory event-trigger transportation requests before the occurrence of events and monitoring the GPS information of incoming requester devices associated with the completion of the event-trigger transportation events the event-trigger transportation matching system can determine requester device arrival times more accurately. Additionally, the event-trigger transportation matching system can factor in additional real-time data, such as event conditions, current weather, number of transportation requests, or traffic conditions with upcoming event-trigger transportation request matches to determine a proper allocation of provider devices. Further, the event-trigger transportation matching system can match requester devices and provider devices based on the scheduled time of the event, such as flight arrivals or other activities, while also accounting for unanticipated delays or event related problems by monitoring the GPS information of the requester device and utilizing location triggers based on real-time location data to determine requester device arrival.

In one or more embodiments, the event-trigger transportation matching system provides additional computational efficiencies. For example, by more accurately managing the balance between provider devices and requester devices across the network, the event-trigger transportation matching system can significantly improve efficiency of implementing devices/servers. For instance, the event-trigger transportation matching system can reduce system resources in communicating with, managing, and matching provider devices and requester devices because the network device balance facilitates more efficient network communications and matching.

Indeed, in some implementations, the event-trigger transportation matching system reduces the number of requests sent over the network by proactively assigning provider devices to an event-trigger transportation request based on the satisfaction of a location trigger. To illustrate, conventional systems that match provider devices with requester devices on-demand often have difficulty accurately anticipating the location and volume of rideshare requests based upon upcoming events resulting in significant re-routing instructions to route provider devices to pickup locations. In contrast, the event-trigger transportation matching can system intelligently route provider devices to suitable areas associated with upcoming event-trigger transportation requests based on determining the ETA of event-trigger requester devices, thereby limiting communications between devices over computer networks. Moreover, the event-trigger transportation matching system can provide timely transportation matches and real-time updates to provider devices which results in less cancellation requests (e.g., duplicative requests) and saves computer resources by significantly reducing duplicative matching process and duplicative notifications to both provider devices and requester devices. Thus, the event-trigger transportation matching system can reduce utilization of computing resources (e.g., processing power and/or memory) and improve network bandwidth.

Furthermore, in one or more implementations the event-trigger transportation matching system improves flexibility and functionality relative to conventional systems. For example, many conventional systems utilize rigid time-based matching system. In contrast, the event-trigger transportation matching system can intelligently allow requester devices to request an upcoming event-trigger transportation match for a dynamic time in the future (e.g., based on the completion of a future event), instead of scheduling a rigid transportation match for a specified time. By providing for event-trigger transportation requests, the event-trigger transportation matching system can provide a seamless and timely transportation match for the requester device while accounting for unanticipated changes in the timing of the event. Indeed, the event-trigger transportation matching system can also provide more flexible graphical user interfaces that allow requester devices to request and manage event-trigger transportation services.

Additionally, the event-trigger transportation matching system can provide more flexibility for provider devices by more accurately estimating the need for provider devices based on upcoming events, thereby freeing provider devices to operate more efficiently. Indeed, in one or more embodiments, the event-trigger transportation matching system also improves flexibility in dynamically responding to different circumstances. For example, the event-trigger transportation matching system can utilize different approaches depending on device imbalances (e.g., the number of requester devices and/or provider devices within a region). Thus, for example, the event-trigger transportation matching system can proactively pre-dispatch provider devices from alternate locations (where the number of provider devices is high relative to the number of requester devices) based on upcoming event-trigger transportation requests (e.g., requester device ETAs). Thus, the event-trigger transportation matching system flexibly shifts provider devices based on the dynamic balance between requester devices and provider devices.

The event-trigger transportation matching system can utilize a variety of computer-implemented models to intelligently determine and implement event-trigger transportation matches for matching provider devices to event-trigger transportation requests. For example, in one or more embodiments the event-trigger transportation matching system utilizes a transportation model trained on historical features, current features, and contextual features and intelligently determines approaches or algorithms to apply for the event-trigger transportation request. Moreover, in some implementations, the event-trigger transportation matching system utilizes a model to determine other parameters, such as the number of provider devices to reserve for event-trigger transportation services, the number of provider devices to dispatch to a pickup location, a number of provider devices to pre-dispatch, a particular distance to use for a geofence boundary, predicted wait times at the pickup location, and/or a threshold requester device ETA time. For example, in one or more implementations the event-trigger transportation matching system utilizes a simulation model, an objective function, and/or a machine learning model to determine these parameters. Indeed, the event-trigger transportation matching system utilizes a computer implemented model to select parameters to generate matches for event-trigger transportation requests.

As indicated by the foregoing discussion, the present disclosure utilizes a variety of terms to describe features and advantages of the event-trigger transportation matching system. For example, as used herein, the term "provider device" refers to a computing device associated with a transportation provider or driver (e.g., a human driver or an autonomous computer system driver) that operates a transportation vehicle. For instance, a provider device refers to a mobile device such as a smartphone or tablet operated by a provider—or a device associated with an autonomous vehicle that drives along transportation routes.

As suggested above, the term "requester device" refers to a computing device associated with a requester that submits a transportation request to a transportation matching system. For instance, a requester device receives interaction from a requester in the form of user interaction to submit a transportation request. After the transportation matching system matches a requester (or a requester device) with a provider (or a provider device), the requester can await pickup by the provider at a predetermined pick-up location. Upon pick-up, the provider transports the requester to a drop-off location specified in the requester's transportation request. Accordingly, a requester may refer to (i) a person who requests a request or other form of transportation but who is still waiting for pickup, (ii) a person who requests a request or other form of transportation for another person, or (iii) a person whom a transportation vehicle has picked up and who is currently riding within the transportation vehicle to a drop-off location.

As used herein, the term "transportation request" refers to a request from a requesting device (i.e., a requester device) for transport by a transportation vehicle. In particular, a transportation request includes a request for a transportation vehicle to transport a requester or a group of individuals from one geographic area to another geographic area. A transportation request can include information such as a pick-up location, a destination location (e.g., a location to which the requester wishes to travel), a request location (e.g., a location from which the transportation request is initiated), location profile information, a requester rating, or a travel history. As an example of such information, a transportation request may include an address as a destination location and the requester's current location as the pick-up location. A transportation request can also include a requester device initiating a session via a transportation matching application and transmitting a current location (thus, indicating a desire to receive transportation services from the current location).

Moreover, as used herein, the term "event-trigger transportation request" refers to a transportation request for pickup at a pickup location corresponding to a future event. A transportation request can include an event-trigger transportation request. In particular, an event-trigger transportation request can include a transportation request that identifies a pickup location at a location relative to a future event (and/or a future time). Thus, reserving provider devices for event-trigger transportation matches includes delaying a final transportation match for a provider device so that the requester device can travel to the pickup location at a time corresponding to the competition of the future event.

Further, as used herein, a "future event" is an event that is expected to occur at some point in time after the present moment. For example, a future event can be arriving at or completion of a flight, cruise, bus ride, conference, festival, appointment, or concert. A future event can also include a person arriving at a particular location. Relatedly, a "future event indicator," as used herein, is an indicator on a graphical user interface that displays a future event. For example, a future indicator can include a date, time, progress bar, timeline, text, image, or description associated with a future event.

Additionally, as used herein, the term "contextual transportation features" refers to details, information, and circumstances corresponding to a transportation request. In particular, contextual transportation features can include information about a rideshare device, an associated event, a passenger profile (e.g., preferences, needs, behavior, urgency), a pickup location, a destination, a time of day, an amount of luggage, a size of vehicle requested, a special request, or a request for special assistance (e.g., a request for handicap-accessible options).

In addition, as used herein, the term "global positioning data" (or "GPS information") refers to location information corresponding to a global positioning system. In particular, global positioning data includes digital data reflecting a location of a provider device and/or requester device. For example, provider devices and/or requester devices can communicate with satellites of a global positioning system to determine coordinates of the provider devices and/or requester devices. Moreover, the provider devices and/or requester devices can transmit global positioning data to one or more servers.

Further, as used herein, the term "geofence boundary" refers to a geographic area or location defined by a virtual boundary. In particular, a geofence boundary encompasses a geofence area (e.g., geographic area). As used herein, geofence areas can be defined with various sizes and shapes, from circular areas to more complex polygonal shapes. For example, a geofence boundary can include a geofence that encompasses a common pickup location at an airport. Similarly, a geofence boundary can include a defined set of roadways/walkways leading to or from an airport and pickup locations at the airport. Relatedly, a "geofence indicator" is an indicator on a graphical user interface that displays an associated geofence boundary. For example, a geofence indicator can include a depiction of a boundary using a colored overlay, a dotted line, a text label, an icon, or a symbol.

In addition, as used herein, the term "pickup location" refers to a location that a provider device can pick up a requested device. For example, an airport pickup location can include a designated curb or lot for provider devices to pick up requester devices at an airport.

Further, as used herein, the term "location trigger" refers to an activating occurrence or incident based on a location. For instance, a location trigger can include a requester device arriving at a particular location (or being within an estimated time of arrival at a particular location) to initiate a transportation matching process. Thus, a location trigger can include detecting a requester device entering or exiting a specific geographic location. In particular, a location trigger can be satisfied when the requester device enters a threshold of a geofence area and/or is within a threshold ETA of a pickup location.

As used herein, the term "pre-dispatch" refers to a dispatching a provider device to a pickup location before identifying a transportation match (e.g., a matching requester device corresponding to a transportation request). In particular, pre-dispatching a provider device includes dispatching a provider device from an area outside of a pickup location threshold without a matched requester device. In some implementations, the event-trigger transportation matching system dispatches a provider device without a match based on a location trigger to provide a transportation match more efficiently for requester devices.

Further, as used herein, the term "pool of available provider devices" refers to a group or set of provider devices available to be matched with requester devices. In particular, the pool of available provider devices can include unmatched provider devices or provider devices predicted to be available (e.g., within a threshold time or within a threshold distance).

Relatedly, as used herein, the term "provider device requester device balance metric" refers to a measure of a balance between provider devices and requester devices. In particular, a provider device requester device balance metric includes a metric indicating the number of available provider devices relative to requester devices. For example, a high number of excess provider devices relative to requester devices can reflect a high provider device requester device balance metric. Similarly, a high number of excess requester devices relative to provider devices can reflect a low provider device requester device balance metric.

Moreover, as used herein, the term "transportation model" refers to a computer-implemented model for generating a predicted or anticipated transportation metric. To illustrate, a transportation model can include a computer-implemented model for predicting a requester device ETA. In one or more embodiments, a prediction model includes a machine learning model. As used herein, the term "machine learning model" refers to a computer algorithm or a collection of computer algorithms that automatically improve for a particular task through experience based on use of data. For example, a machine learning model can utilize one or more learning techniques to improve in accuracy and/or effectiveness. Example machine learning models include various types of decision trees, support vector machines, Bayesian networks, linear regressions, logistic regressions, random forest models, or neural networks.

Additional detail regarding the event-trigger transportation matching system will now be provided with reference to the figures. In particular, FIG. 1 illustrates a block diagram of a system environment for implementing an event-trigger transportation matching system 106 in accordance with one or more embodiments. As shown in FIG. 1, the environment includes server(s) 102 housing the event-trigger transportation matching system 106 as part of a transportation matching system 104. The environment of FIG. 1 further includes a provider device(s) 122 (including a provider application 110) and a requester device(s) 112 (including a requester application 114), as well as a network 116. The server(s) 102 can include one or more computing devices to implement the event-trigger transportation matching system 106. The environment of FIG. 1 further includes a third-party system(s) 132 (including a vehicle navigation system 134). Additional detail regarding the illustrated computing devices (e.g., the server(s) 102, the provider device(s) 122, the requester device(s) 112, and/or the third-party system(s) 132) is provided with respect to FIGS. 10-11 below.

As shown, the event-trigger transportation matching system 106 utilizes the network 116 to communicate with the provider device(s) 122 and the requester device(s) 112. The network 116 may comprise any network described in relation to FIGS. 10-11. For example, the event-trigger transportation matching system 106 communicates with the provider device(s) and the requester device(s) 112 to match transportation requests received from the requester device(s) 112 with the provider device(s) 122. Indeed, the transportation matching system 104 or the event-trigger transportation matching system 106 can receive a transportation request from the requester device(s) 112 and can provide request information to various provider devices, such as a requested location (e.g., a requested pickup location and/or a requested drop-off location), an associated event (e.g., a future event), and a requester identification (e.g., for a requester corresponding to the requester device(s) 112). In some embodiments, per device settings, the transportation matching system 104 or the event-trigger transportation matching system 106 receives device information from various provider devices and the requester device(s) 112, such as location coordinates (e.g., latitude, longitude, and/or elevation), orientations or directions, motion information, and indications of user interactions with various interface elements.

To facilitate connecting event-trigger transportation requests with transportation vehicles, in some embodiments, the transportation matching system 104 or the event-trigger transportation matching system 106 communicates with the provider device(s) 122 and other provider devices (e.g., through a provider application 110). As indicated by FIG. 1, the provider device(s) 122 includes the provider application 110. In many embodiments, the transportation matching system 104 or the event-trigger transportation matching system 106 communicates with the provider device(s) 122 through the provider application 110 to, for example, receive and provide information including location data, motion data, transportation request information (e.g., pickup locations and/or drop-off locations), and transportation route information for navigating to one or more designated locations.

Similarly, the transportation matching system 104 or the event-trigger transportation matching system 106 communicates with the requester device(s) 112 (e.g., through the requester application 114) to facilitate connecting requests with transportation vehicles. In many embodiments, the event-trigger transportation matching system 106 communicates with the requester device(s) 112 through the requester application 114 to, for example, receive and provide information including location data, motion data, transportation request information (e.g., requested locations), and navigation information to guide a requester to a designated location.

As indicated above, the transportation matching system 104 or the event-trigger transportation matching system 106 can provide (and/or cause the provider device(s) 122 to display or render) visual elements within a graphical user interface associated with the provider application 110 and the requester application 114. For example, the transportation matching system 104 or the event-trigger transportation matching system 106 can provide a digital map for display on the provider device(s) 122 that illustrates a transportation route to navigate to a designated location. The event-trigger transportation matching system 106 can also provide a transportation request notification for display on the provider device(s) 122 indicating a transportation request.

Moreover, as illustrated the event-trigger transportation matching system 106 provides a user interface via the requester device(s) 112 that includes selectable options for various types of transportation requests (e.g., a standard transportation request, an event-trigger transportation request). To illustrate, the selectable option for an event-trigger transportation request includes additional detail about an associated event relative to the other types of transportation requests. In response to selection of the option corresponding to the event-trigger transportation request, the event-trigger transportation matching system 106 facilitates an event-trigger transportation match. Moreover, after the satisfaction of the location trigger, the event-trigger transportation matching system 106 identifies a provider device to match to the requester device(s) 112. In addition, the event-trigger transportation matching system 106 can provide a digital map for display on the requester device(s) 112, where the digital map illustrates the pickup location.

Although FIG. 1 illustrates the environment having a particular number and arrangement of components associated with the event-trigger transportation matching system 106, in some embodiments, the environment may include more or fewer components with varying configurations. For example, in some embodiments, the transportation matching system 104 or the event-trigger transportation matching system 106 can communicate directly with the provider device(s) 122 and/or the requester device(s) 112, bypassing the network 116. In these or other embodiments, the transportation matching system 104 or the event-trigger transportation matching system 106 can be housed (entirely on in part) on the provider device(s) 122 and/or the requester device(s) 112. Additionally, the transportation matching system 104 or the event-trigger transportation matching system 106 can include or communicate with a database for storing information, such as various machine learning models, historical data (e.g., historical provider device and/or requester device patterns), transportation requests, and/or other information described herein.

As mentioned, in one or more embodiments, the event-trigger transportation matching system 106 intelligently schedules event-trigger transportation matches to intelligently provide matches for event-trigger transportation requests. For example, FIG. 2 illustrates an example sequence flow for providing an event-trigger transportation match between a provider device and requester device in accordance with one or more embodiments.

Figure 2:
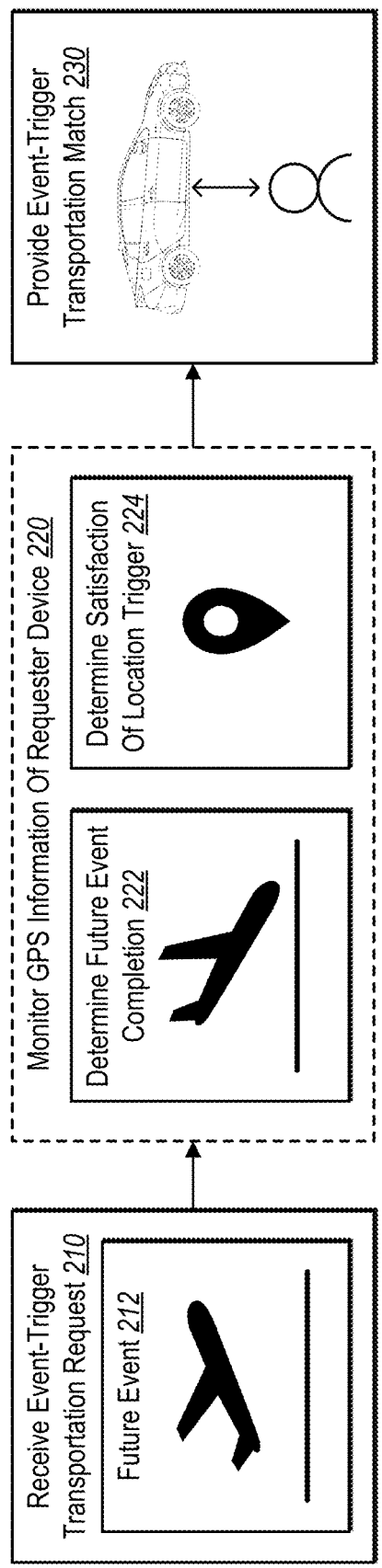
FIG. 2 illustrates an example sequence flow for providing an event-trigger transportation match between a provider device and requester device in accordance with one or more embodiments.

Specifically, FIG. 2 illustrates the event-trigger transportation matching system 106 performing an act 210 receiving an event-trigger transportation request and determining an associated future event 212. For example, the event-trigger transportation matching system 106 performs the act 210 by receiving input from a requester device requesting transportation associated with an event-trigger transportation request. As shown, the event-trigger transportation matching system 106 determines a future event 212 associated with the transportation request. In one or more embodiments, the event-trigger transportation matching system 106 identifies a future event 212 is associated with the event-trigger transportation request through user input providing information about the future event. For example, the event-trigger transportation matching system 106 accepts input from the requester device selecting or identifying a future event 212 and a transportation request associated with the conclusion of the future event 212. In one or more embodiments, the event-trigger transportation matching system 106 identifies an associated future event 212 through contextual information associated with the transportation request. For example, the event-trigger transportation matching system 106 utilizes user input comprising one or more of a current requester device location, a remote pickup location (e.g., hundreds of miles away), pickup location (e.g., next to an airport), pickup time, or a large amount of luggage to determine that the event-trigger transportation request is associated with an upcoming flight (e.g., future event 212). As another example, the event-trigger transportation matching system 106 utilizes user input comprising one or more of a pickup location (e.g., at a boat dock), pickup time, or event schedule to determine that the event-trigger transportation request is associated with an upcoming cruise (e.g., future event 212).

In one or more embodiments, the event-trigger transportation matching system 106 uses historical data analysis to pick a future event to associate with a transportation request. For example, the event-trigger transportation matching system 106 analyzes past transportation requests (e.g., from one or more requester devices) to determine similar historical transportation requests that were associated with events. In one or more embodiments, the event-trigger transportation matching system 106 uses machine learning-based prediction to pick a future event to associate with a transportation request. For example, the system could use historical data and other relevant features, such as pickup location or requester device settings, to train a machine learning model to predict an association between the transportation request and future events.

As further illustrated in FIG. 2, the event-trigger transportation matching system 106 also performs an act 220 of monitoring GPS information of a requester device. In particular, the event-trigger transportation matching system 106 monitors the GPS information of the requester device to determine a future event completion 222 and/or determine a satisfaction of a location trigger 224. For example, in one or more embodiments, the event-trigger transportation matching system 106 monitors the GPS information of the requester device to determine the future event completion 222 by determining that the requester device location corresponds to the location of the completion of the future event 212. As another example, to determine a future event completion 222, the event-trigger transportation matching system 106 receives an indication from the requester device that the event has completed and the event-trigger transportation matching system 106 determines that the GPS information of the requester device corresponds to the event completion location. As another example, the event-trigger transportation matching system 106 determines that the future event 212 has completed because the scheduled time for the competition of the event has passed and the event-trigger transportation matching system 106 determines that the GPS information of the requester device corresponds to the event completion location. Notably, although the event-trigger transportation matching system 106 monitors the GPS information of the requester device to determine the future event completion, the event-trigger transportation matching system 106 can determine the future event completion based on receiving an indication from the requester device that the event has completed or other contextual indications (e.g., in case of inaccurate GPS information).

Furthermore, the event-trigger transportation matching system 106 monitors the GPS information to determine a satisfaction of a location trigger 224 indicating that the requester device is within a threshold time and/or distance of the pickup location. In particular, in one or more embodiments, the event-trigger transportation matching system 106 begins monitoring the requester device GPS information when the event-trigger transportation match is requested. Alternatively, in one or more embodiments, the event-trigger transportation matching system 106 begins monitoring the requester device GPS information after determining the completion of the future event. In one or more embodiments, the event-trigger transportation matching system 106 determines the satisfaction of a location trigger by monitoring the requester device GPS to determine an ETA (e.g., estimated time of arrival) relative to the pickup location the requester device. Determining and utilizing a requester device ETA trigger is described in more detail below.

Furthermore, in one or more embodiments, the event-trigger transportation matching system 106 determines the requester device satisfies the location trigger when the requester device enters a geofence boundary relative to the pickup location (e.g., a geofence encompassing a pickup location). For example, the event-trigger transportation matching system 106 monitors the GPS information of the requester device to determine if the requester device is located within the geofence boundary. In one or more embodiments, the event-trigger transportation matching system 106 can also determine satisfaction of the geofence boundary trigger by monitoring an additional threshold area (e.g., buffer region) within a geographic area of the geofence boundary to determine if the requester device is located within the additional threshold area and/or the geofence boundary. Notably, the area of the buffer region can be disproportionate to the geofence boundary, meaning that all sides of the buffer region do not need to be equidistant from the geofence boundary. Indeed, the event-trigger transportation matching system 106 can determine whether the location trigger is satisfied by monitoring the GPS information of the requester device and comparing the GPS position of the requester device to the geofence boundary. Determining and utilizing a geofence boundary trigger is described in more detail below.

As further illustrated in FIG. 2, the event-trigger transportation matching system 106 performs the act 230 to provide an event-trigger transportation match. Indeed, after determining the satisfaction of the location trigger, the event-trigger transportation matching system 106 matches a provider device in the pool of available provider devices to the requester device and dispatches the provider device to satisfy the event-trigger transportation request.

Figure 3:
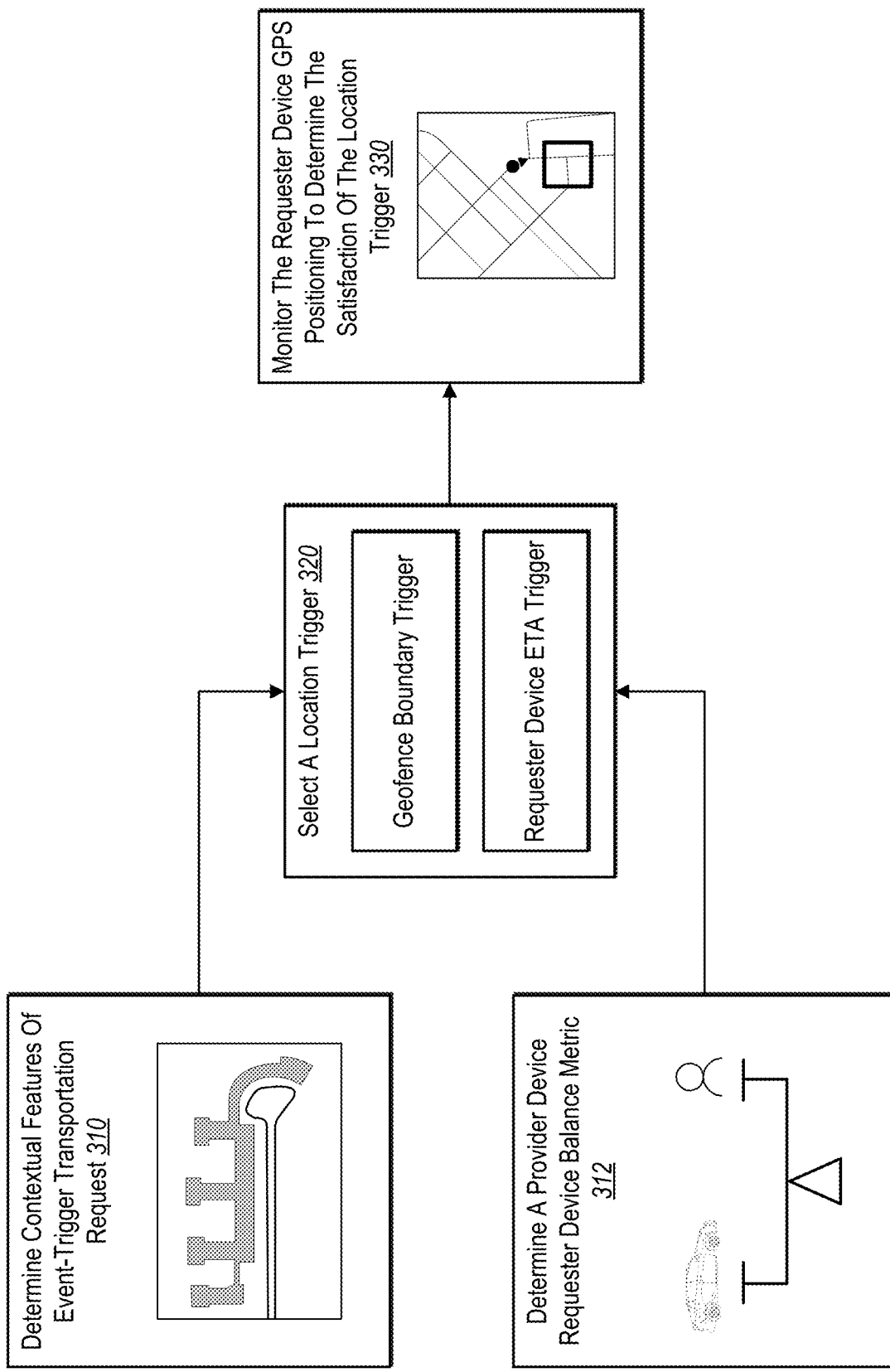
FIG. 3 illustrates monitoring a requester device GPS information to detect satisfaction of a location trigger in accordance with one or more embodiments.

As mentioned, the event-trigger transportation matching system 106 monitors the GPS information of a requester device to detect the satisfaction of a location trigger associated with the pickup location. FIG. 3 illustrates the event-trigger transportation matching system 106 monitoring the GPS information of a requester device to detect the satisfaction of a location trigger in accordance with one or more embodiments.

As illustrated in FIG. 3, the event-trigger transportation matching system 106 performs the act 310 to determine contextual features of the event-trigger transportation request. In particular, the event-trigger transportation matching system 106 determines contextual features to generate a transportation match between the requester device and a provider device. For example, the event-trigger transportation matching system 106 determines features associated with the transportation request such as the pickup location, special requests (e.g., need for assistance, use of a child seat, size of vehicle), historical requester device attributes (e.g., past behavior, physical needs), and/or distance to the pickup location. Further, the event-trigger transportation matching system 106 determines features associated with an associated event such as the pickup location, estimated completion time, estimated traffic congestion, and/or weather. Indeed, in one or more embodiments, the event-trigger transportation matching system 106 determines one or more of the contextual features from user input providing the features to the event-trigger transportation matching system 106. In one or more embodiments, the event-trigger transportation matching system 106 determines one or more of the contextual features by comparing the qualities of the transportation request (e.g., pickup location, historical patterns) to outside sources (e.g., airline schedule, event schedule, news reports).

As further illustrated in FIG. 3, the event-trigger transportation matching system 106 performs the act 312 to determine a provider device requester device balance metric reflecting a measure of the balance between available provider devices and requester devices. In particular, the event-trigger transportation matching system 106 determines the provider device requester device balance metric based on the number of provider devices in a pool of available provider devices and a number of anticipated transportation requests from requester devices (e.g., event-trigger transportation requests, standard transportation requests, priority transportation requests, etc.). For example, in one or more embodiments, the provider device requester device balance metric is calculated by dividing the total number of available provider devices (e.g., provider devices in the pool) by the total number of anticipated requester devices (e.g., event-trigger transportation requests and/or anticipated rideshare need). If the ratio is skewed towards provider devices (e.g., a high metric), the event-trigger transportation matching system 106 determines there is an excess number of available provider devices. If the ratio is skewed towards requester devices (e.g., a low metric), the event-trigger transportation matching system 106 determines there are not enough available provider devices for the anticipated demand.

Notably, the number of anticipated transportation requests can be based on the number of requester devices with upcoming event-trigger transportation requests (e.g., the associated future event has completed), currently unsatisfied transportation matches, and/or a historical pattern of transportation requests. Additionally, in one or more embodiments, the event-trigger transportation matching system 106 determines a number of available provider devices from the pool of available provider devices by determining the number of available provider devices within a pickup location threshold (e.g., threshold ETA or threshold distance). The event-trigger transportation matching system 106 can determine a number of available provider devices based on unmatched provider devices, unassigned provider devices, and/or provider devices that will be available within a threshold period of time (e.g., provider devices that will complete transportation matches or arriving provider devices).

As further illustrated in FIG. 3, the event-trigger transportation matching system 106 performs the act 320 to select a location trigger for the event-trigger transportation request. As shown, the event-trigger transportation matching system 106 can select an event trigger from a geofence boundary trigger, a requester device ETA trigger, and/or a combination of a geofence boundary trigger and a requester device ETA trigger. Notably, the event-trigger transportation matching system 106 selects the location trigger based on a variety of contextual features or a provider device requester device balance metric. Indeed, the event-trigger transportation matching system 106 can select the location trigger based on the number of provider devices in the pool of available provider devices corresponding to the pickup location (e.g., the provider device requester device balance metric).

To illustrate, in one or more embodiments, based on an estimated need for provider devices, the event-trigger transportation matching system 106 determines that the number of provider devices in the pool of available provider devices does not satisfy a threshold number of provider devices (e.g., a low provider device requester device balance metric) and selects a requester device ETA as the location trigger. In contrast, in one or more embodiments, the event-trigger transportation matching system 106 determines that the number of provider devices in the pool of available provider devices satisfies a threshold number of provider devices (e.g., a high provider device requester device balance metric) and selects a geofence location as the location trigger. In one or more embodiments, the event-trigger transportation matching system 106 selects a requester device ETA trigger or a combination of the requester device ETA trigger and a geofence boundary trigger.

As further shown in FIG. 3, the event-trigger transportation matching system 106 performs the act 330 to monitor the requester device GPS information to determine the satisfaction of the location trigger. In particular, the event-trigger transportation matching system 106 monitors the GPS information of the requester device and compares the GPS information to the proximity of the geofence boundary when using a geofence boundary trigger and determines a requester device ETA when using a requester device ETA trigger. For example, when using a geofence boundary trigger the event-trigger transportation matching system 106 determines the geofence boundary trigger is met when a requester device enters the geofence area within the geofence boundary (or the buffer zone area). As another example, when using a requester device ETA trigger, the event-trigger transportation matching system 106 monitors the GPS information of the requester device to determine a requester device ETA to the pickup location for the requester device and determines the requester device ETA trigger is met when the requester device ETA is within a threshold ETA.

Figure 4:
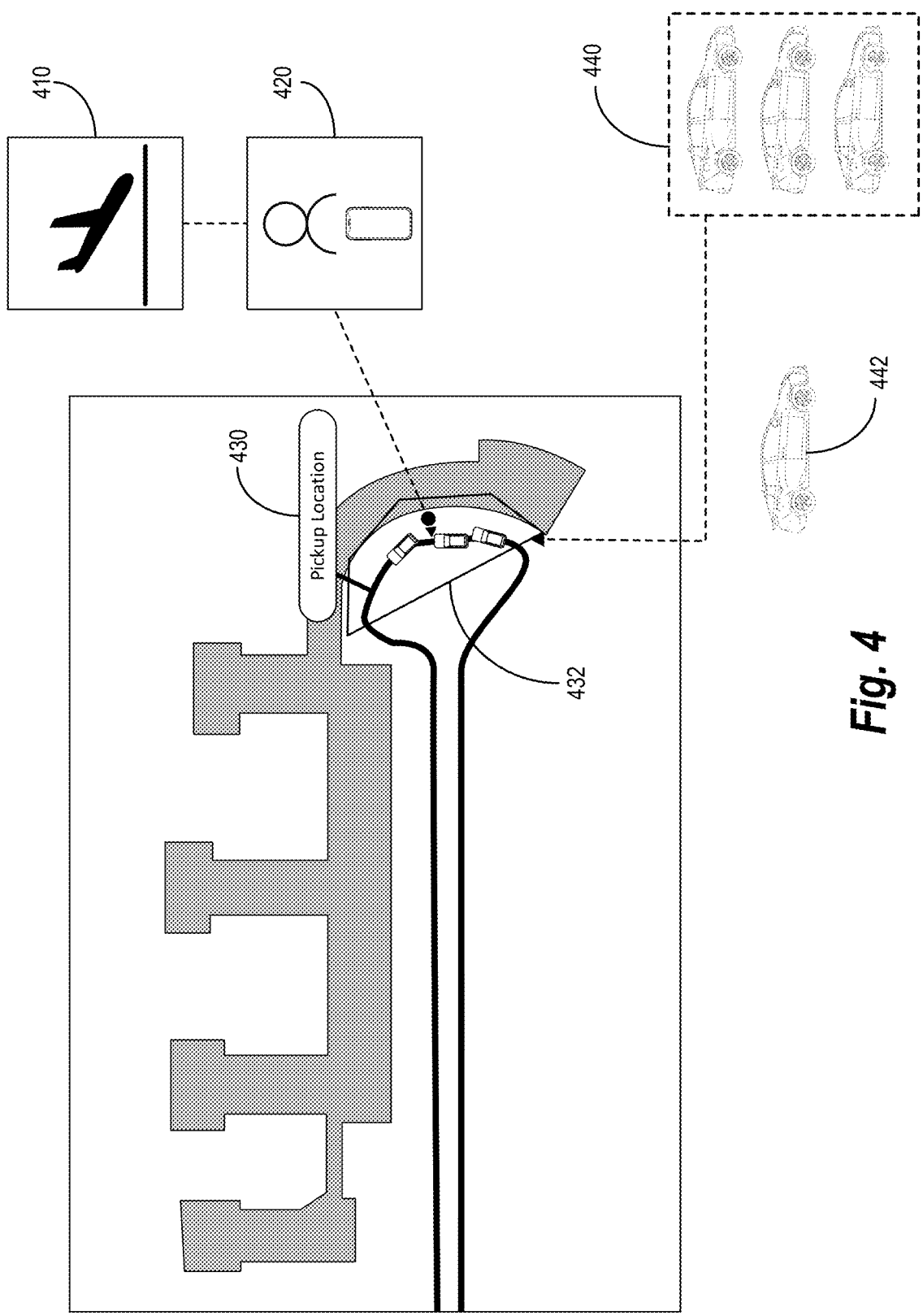
FIG. 4 illustrates an example sequence flow for generating an event-trigger transportation match between a provider device and requester device in accordance with one or more embodiments.

As mentioned, in some implementations the event-trigger transportation matching system 106 generates event-trigger transportation matches associated with future events. FIG. 4 illustrates a sequence flow for generating an event-trigger transportation match between a provider device and requester device in accordance with one or more embodiments.

As mentioned above, the event-trigger transportation matching system 106 can determine that the future event has completed in multiple ways. In particular, the event-trigger transportation matching system 106 can perform an act 410 to determine the completion of the future event. In one or more embodiments, the event-trigger transportation matching system 106 can receive an indication from the requester device that the event has completed. In particular, the event-trigger transportation matching system 106 can determine the future event has completed due to the requester device accessing an event-trigger transportation request application and/or a user interacting with a selection on a requester device graphical user interface verifying that the future event has completed. As another example, the event-trigger transportation matching system 106 can determine the future event has completed through contextual clues such as the movement speed of the requester device, the requester device disconnecting or reconnecting to the internet, the requester device accessing an application, a request by the requester device for assistance in traveling to the pickup location (e.g., directions, map), a request from the requester device for estimated pickup wait time, a request by the requester device for directions to baggage claim, or other contextual clues.

In one or more embodiments, the event-trigger transportation matching system 106 determines the completion of the future event by monitoring the GPS information of the requester device. In particular, the event-trigger transportation matching system 106 compares the GPS information of the requester device with the future event completion location to determine if the future event has completed. As another example, the event-trigger transportation matching system 106 can determine that the future event has completed because the scheduled time for the competition of the event has passed. As another example, the event-trigger transportation matching system 106 determines the future event has completed based on monitoring a scheduling system (e.g., tracking airline flight schedules) and determining completion of the associated future event.

As further illustrated in FIG. 4, the event-trigger transportation matching system 106 monitors a requester device 420 to determine the requester device satisfies a location trigger. As described above, the event-trigger transportation matching system 106 monitors the requester device GPS information (and utilizes other contextual factors as described above) to determine a satisfaction of the location trigger (e.g., requester device ETA trigger and/or geofence boundary trigger).

In particular, in one or more embodiments, the event-trigger transportation matching system 106 selects a geofence boundary trigger for the location trigger. For example, when selecting a geofence boundary trigger for the location trigger, the event-trigger transportation matching system 106 determines a geofence boundary encompassing a geofence area including the pickup location and monitors the GPS information of the requester device to determine when the requester device enters the geofence boundary. As mentioned, in one or more embodiments, the event-trigger transportation matching system 106 can include an additional threshold area around the geofence boundary (e.g., buffer zone), and this threshold area is included by the event-trigger transportation matching system 106 when determining the geofence boundary trigger has been satisfied. Indeed, in one or more embodiments, by utilizing an additional buffer zone around the geofence area, the event-trigger transportation matching system 106 can account for inconsistencies in the reported GPS location of the requester device and utilize a modified geofence boundary as the geofence boundary trigger (e.g., the geofence boundary and the additional threshold area).

Similarly, in one or more embodiments, the event-trigger transportation matching system 106 selects a requester device ETA trigger for the location trigger. For example, when selecting a requester device ETA trigger for location trigger, the event-trigger transportation matching system 106 determines a geofence boundary encompassing a geofence area including the pickup location and monitors the GPS information of the requester device to determine the location of the requester device compared to the geofence boundary. In particular, the event-trigger transportation matching system 106 monitors the GPS information of the requester device to estimate the progress of the requester device toward the pickup location and determine a requester device ETA. The event-trigger transportation matching system 106 further identifies when the requester device ETA is within a threshold ETA of the pickup location (e.g., a threshold ETA from the geofence boundary and/or the pickup location).

The event-trigger transportation matching system 106 can also determine a variety of threshold ETA measures for individual requester devices. For example, the event-trigger transportation matching system 106 can determine a different threshold ETA depending on, provider device ETA, a number of provider devices, a device balance metric, or a wait time metric (e.g., average current wait time for requester devices at the pickup location). The event-trigger transportation matching system 106 can thus initiate a transportation request earlier with a higher threshold ETA for pickup locations with a high provider device ETA, a low number of provider devices, an imbalanced device balance metric, or a high wait time metric. Similarly, the event-trigger transportation matching system 106 can place an event-trigger transportation request in a virtual queue and determine the threshold ETA based on the location within the virtual queue (e.g., a higher threshold ETA for a lower place in the virtual queue). In one or more embodiments, the event-trigger transportation matching system 106 can also utilize these signals to select a geofence boundary.

In one or more embodiments, the event-trigger transportation matching system 106 determines the ETA based on a combination of factors including contextual transportation features of the transportation request, the GPS information of the requester device, routes between the current requester device and the pickup location, current congestion conditions, current requester device location, historical data, time of day, weather conditions, or other incidents that will impact travel time. To illustrate, the event-trigger transportation matching system 106 can determine the requester device ETA based on a determining the current location of the requester device, determining a route between the current location and the pickup location, and determining an estimated time to travel along the route based on contextual transportation features. Similarly, the event-trigger transportation matching system 106 can determine that a requester has luggage to pick up. The event-trigger transportation matching system 106 can determine the requester device ETA by including time to travel to a luggage pickup location, wait for the luggage, and travel from the luggage pickup location.

Indeed, as shown, after the competition of the future event, the requester device 420 moves toward the pickup location 430 within the geofence boundary 432. The event-trigger transportation matching system 106 can direct the user of the requester device to the pickup location through information displayed on a graphical user interface (and/or audible instructions including tones/vibrations) of the requester device as shown below in relation to FIGS. 8A-8B.

Furthermore, in one or more embodiments, as the requester device 420 moves toward the pickup location 430, the event-trigger transportation matching system 106 determines an ETA for the requester device to travel to a position within the geofence boundary 432. In particular, the event-trigger transportation matching system 106 determines a requester device ETA through monitoring the GPS information of the requester device and/or analyzing other contextual and historical information. Additionally, the event-trigger transportation matching system 106 determines an ETA for provider devices in the pool of available provider devices 440 to travel to the geographic area within the geofence boundary 432.

As mentioned, in one or more embodiments, the event-trigger transportation matching system 106 determines a provider device requester device balance metric between available provider devices and requester devices. In particular, the event-trigger transportation matching system 106 determines a provider device requester device balance metric based on the number of available provider devices relative to requester devices (e.g., event-trigger transportation matching requester devices and/or additional transportation matching requester devices). As discussed, a high number of excess provider devices relative to requester devices reflects a high provider device requester device balance metric. If the ratio is skewed towards provider devices (e.g., a high metric), the event-trigger transportation matching system 106 determines there is an excess number of available provider devices in the pool of available provider devices. Conversely, if the ratio is skewed towards requester devices (e.g., a low metric), the event-trigger transportation matching system 106 determines there are not enough provider devices in the pool of available provider devices for the anticipated demand.

Indeed, the event-trigger transportation matching system 106 can flexibly allocate provider devices to the pool of available provider devices based on the provider device requester device balance metric. In particular, if the event-trigger transportation matching system 106 determines a low provider device requester device balance metric, the event-trigger transportation matching system 106 can flexibly adapt and reserve one or more additional provider devices (e.g., provider device 442) from different locations to fill the anticipated need for provider devices at the pickup location. Conversely, if the event-trigger transportation matching system 106 determines a high provider device requester device balance metric, the event-trigger transportation matching system 106 can flexibly adapt and release provider devices from the pool of available provider devices (e.g., provider devices 440) to fulfill transportation requests in other locations.

As further shown in FIG. 4, after the event-trigger transportation matching system 106 determines the requester device 420 enters the geofence boundary 432, the event-trigger transportation matching system 106 generates an event-trigger transportation match. In particular, the event-trigger transportation matching system 106 monitors the GPS information of the requester device to determine the requester device has moved to the area within the geofence boundary 432. Upon determining the requester device is within the geofence boundary 432, the event-trigger transportation matching system 106 selects a provider device from the pool of available provider devices 440 and dispatches the provider device to the pickup location 430 to satisfy the event-trigger transportation match. In one or more embodiments, the event-trigger transportation matching system 106 informs the user of the status of the event-trigger transportation match through information displayed on a graphical user interface (and/or audible instructions including tones/vibrations) as shown below in relation to FIGS. 8A-8B. The event-trigger transportation matching system 106 transmits navigation instructions to the provider device to transport the requester device from the pickup location.

Although not shown, in one or more embodiments, the event-trigger transportation matching system 106 can utilize a buffer zone around the geofence boundary 432. For example, the event-trigger transportation matching system 106 can extend the area of the geofence boundary 432 by including a buffer zone and generate a transportation match if the event-trigger transportation matching system 106 determines the requester device 420 enters the geofence boundary 432 and/or the buffer zone. Indeed, by utilizing a buffer zone, the event-trigger transportation matching system 106 can account for factors such as poor GPS tracking signals, unexpected delays in certain locations (e.g., requester device or provider device delays), or transportation match demand fluctuations. Notably, the event-trigger transportation matching system 106 can utilize a buffer zone that is not uniformly sized compared to the geofence boundary 432 and is larger or smaller on each side of the geofence boundary 432 (e.g., irregular in size).

Further, in one or more embodiments, the event-trigger transportation matching system 106 can utilize an ETA for the provider device to enter the geofence boundary 432 to generate an event-trigger transportation match. For example, the event-trigger transportation matching system 106 can estimate the arrival time for the provider device to enter the geofence boundary 432 (including a buffer zone) and generate a transportation match if the event-trigger transportation matching system 106 determines the requester device 420 is within a threshold ETA of the geofence boundary 432 and/or the buffer zone. Indeed, by utilizing an ETA, the event-trigger transportation matching system 106 can account for factors such as poor GPS tracking signals, unexpected delays in certain locations (e.g., requester device or provider device delays), or transportation match demand fluctuations. Notably, the event-trigger transportation matching system 106 can utilize an ETA that is not identical in time and is larger or smaller depending on fluctuations in transportation requests.

In some embodiments, the event-trigger transportation matching system 106 determines a number of provider devices 440 to reserve in a pool of available provider devices for upcoming event-trigger transportation matches. For example, in one or more embodiments, the event-trigger transportation matching system 106 reserves a certain percentage (e.g., 25%) of provider devices to prioritize event-trigger transportation matches over other transportation matches (e.g., when a requester device approaches the pickup location). Indeed, in some embodiments the event-trigger transportation matching system 106 utilizes a machine learning model, simulator model, and/or objective function to select the number of provider devices to reserve. For example, the event-trigger transportation matching system 106 can utilize a machine learning model to generate a predicted number of provider devices to reserve. Similarly, the event-trigger transportation matching system 106 can run simulations with different numbers of provider devices and select the number based on simulation results (e.g., that will reduce waiting time for event-trigger transportation requester devices). Moreover, the event-trigger transportation matching system 106 can utilize an objective function that selects the number of provider devices to reserve that reduces wait time for event-trigger transportation requester devices subject to constraints on standard time metrics (e.g., a threshold increase in standard requester device wait times) and provider device time metrics (e.g., a threshold increase in provider device wait time, travel time, or ETA). Thus, the event-trigger transportation matching system 106 can utilize event-trigger transportation requests to more accurately predict the requester devices (and needed provider devices) at future time periods.

Figure 5:
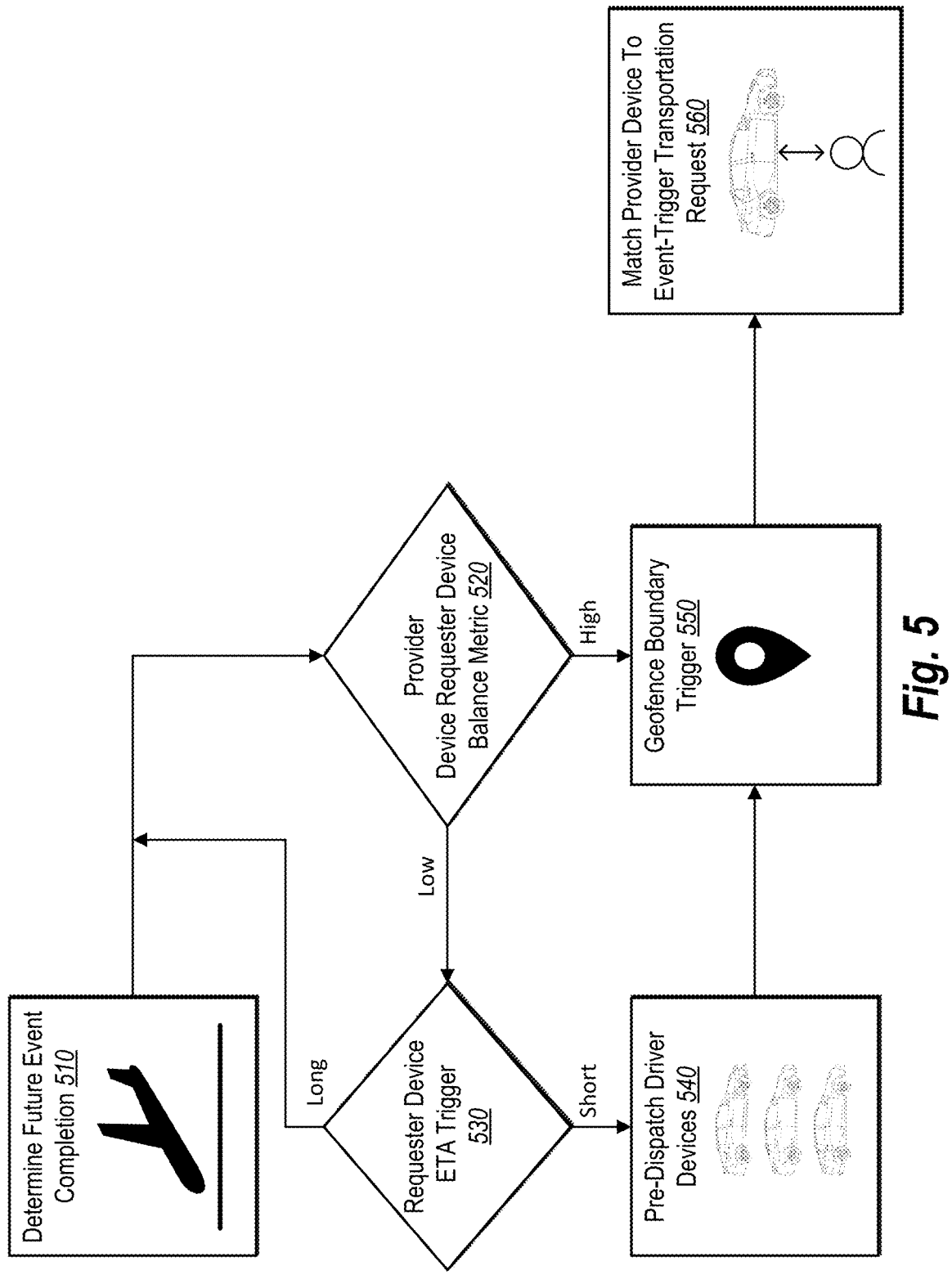
FIG. 5 illustrates an example flow diagram for providing a transportation match utilizing a provider device requester device balance metric to generate an event-trigger transportation match in accordance with one or more embodiments.

As mentioned, the event-trigger transportation matching system 106 generates an event-trigger transportation match in response to the satisfaction of a location trigger and without requiring additional requester device input to initiate the transportation match. FIG. 5 illustrates an example flow diagram of providing a transportation match by utilizing a provider device requester device balance metric to select a location trigger in accordance with one or more embodiments.

As shown in FIG. 5, the event-trigger transportation matching system 106 determines the completion of the future event 510. As shown, the event-trigger transportation matching system 106 performs an act 520 to determine a provider device requester device balance metric. Based on the provider device requester device balance metric, the event-trigger transportation matching system 106 selects a location trigger. In particular, if the provider device requester device balance metric is low, the event-trigger transportation matching system 106 selects the requester device ETA trigger 530. However, if the provider device requester device balance metric is high, the event-trigger transportation matching system 106 selects the geofence boundary trigger 550.

If the event-trigger transportation matching system 106 selects the requester device ETA trigger 530, the event-trigger transportation matching system 106 further determines if the ETA of the requester device is long (e.g., longer than a threshold time) or short (e.g., shorter than a threshold time). If the requester device ETA trigger 530 is long, the event-trigger transportation matching system 106 continues monitoring the provider device requester device balance metric to determine if the provider device requester device balance metric changes (until the requester device ETA trigger 530 is short). However, if the requester device ETA trigger is short, the event-trigger transportation matching system 106 performs act 540 to pre-dispatch additional driver devices to the pool of available provider devices in anticipation of the need for additional driver devices to satisfy upcoming transportation matches. In particular, the event-trigger transportation matching system 106 dispatches one or more additional driver devices sufficient to satisfy anticipated upcoming transportation matches including upcoming event-trigger transportation matches and/or additional anticipated transportation matches. Notably, although not shown, the event-trigger transportation matching system 106 can continue to monitor the provider device requester device balance metric and pre-dispatch one or more additional drivers until the provider device requester device balance metric reaches a threshold value.

After pre-dispatching additional driver devices, the event-trigger transportation matching system 106 utilizes the geofence boundary trigger 550. Further, if the provider device requester device balance metric is high (and the requester device ETA trigger is not utilized), the event-trigger transportation matching system 106 utilizes the geofence boundary trigger 550. When utilizing the geofence boundary trigger 550, the event-trigger transportation matching system 106 monitors the GPS information of the requester device to determine when the requester device enters the geofence boundary and/or buffer zone area. As further shown in FIG. 5, after determining that the requester device satisfies the geofence boundary trigger 550, the event-trigger transportation matching system 106 performs act 560 to match a provider device in the pool of available provider devices to the requester device and dispatches the provider device to satisfy the event-trigger transportation request.

As mentioned above, in one or more embodiments, the event-trigger transportation matching system 106 utilizes one or more prediction models to determine a requester device ETA to the pickup location. For example, FIG. 6 illustrates the event-trigger transportation matching system 106 determining a requester device ETA utilizing an event-trigger ETA transportation model in accordance with one or more embodiments.

As shown in FIG. 6, the event-trigger transportation matching system 106 utilizes historical features 602, current features 604, and contextual features 606 to determine the requester device ETA. In particular, FIG. 6 illustrates the event-trigger transportation matching system 106 utilizing an event-trigger ETA transportation model 610 to perform act 620 to determine a requester device ETA from historical features 602 corresponding to event-trigger transportation request. For example, the event-trigger transportation matching system 106 can identify historical features 602 such as the number, type, wait time, and outcome of event-trigger transportation requests (e.g., from similar event-trigger transportation requests). In some embodiments the event-trigger transportation matching system 106 can also identify current features 604, such as the number of current event-trigger transportation requests, airport arrival and departure schedules, current weather patterns, pedestrian congestion, time of day, pickup location environment, requester device GPS information, the distance between the requester device's location and the desired destination, requester device traveling speed, or other signals that impact requester devices in the vicinity of the pickup location. In some embodiments the event-trigger transportation matching system 106 can also identify contextual features 606, such as an amount of luggage, a need for assistance, a size of requested vehicle, or a requester device profile that that are associated with the event-trigger transportation request.

As mentioned above, the event-trigger transportation matching system 106 can utilize a variety of computer-implemented models to generate the requester device ETA. For example, in one or more embodiments, the event-trigger transportation matching system 106 utilizes a machine learning model (such as a neural network) to generate the requester device ETA. In some embodiments, the event-trigger transportation matching system 106 utilizes a statistical or heuristic model to generate the requester device ETA. In some embodiments, the event-trigger transportation matching system 106 utilizes a machine learning model, such as a neural network or decision-tree to predict the requester device ETA based on these input signals. The event-trigger transportation matching system 106 can train such a machine learning model based on historical input signals (and ground truths or reward functions) to generate requester device ETAs. In one or more implementations, the event-trigger transportation matching system 106 trains a machine learning model on a labeled set of data to learn the relationships between the input features and the target labels. For example, the event-trigger transportation matching system 106 can generate a predicted ETA based on training features, compare the predicted ETA with a ground-truth ETA (e.g., utilizing a loss function), and then modify parameters of the machine learning model based on the comparison (e.g., by back-propagating the loss). Once trained, the machine learning model can be used to make predictions on new, unlabeled event-trigger transportation requests, assigning features to the event-trigger transportation requests based on the learned relationships.

In some embodiments, the event-trigger transportation matching system 106 can utilize a simulation model to determine a requester device ETA by generating a predictive model of the requester device's movements based on historical data and real-time information. The simulation model can use various data sources such as GPS tracking data, pedestrian/vehicle traffic flow data (e.g., from traffic cameras, sensors, transportation data providers), and weather data to simulate the requester device movements and predict its ETA. The historical data can be used to establish patterns of movement, such as typical requester device speed, route, and stops. Real-time information can be used to adjust these patterns to account for current pedestrian/vehicle traffic conditions, weather, stops, and other unforeseen events. As mentioned, the simulation model incorporates factors that may impact the requester device's ETA, such as the historical features 602, the current features 604, and the contextual features 606. The simulation model can be continuously updated as new data becomes available. For example, if the requester device speed changes due to unforeseen events, the simulation model can adjust the ETA accordingly. Similarly, if the requester device changes its route, the simulation model can incorporate this information to provide a more accurate ETA. To evaluate the accuracy of the simulation model, various metrics and performance indicators can be used, such as the mean absolute error (MAE) or root mean square error (RMSE) to measure how closely the model's predictions match the actual behavior of the system and refine and improve the simulation model over time.

As discussed above, the event-trigger transportation matching system 106 can generate an event-trigger transportation match based on an event-trigger transportation request from a requester device. FIGS. 7A-7D illustrate a series of graphical user interfaces for requesting an event-trigger transportation match in accordance with one or more embodiments. As shown in FIGS. 7A-7D, the event-trigger transportation matching system 106 may provide graphical user interfaces 702a, 704a, 706a, and 708a that can be displayed via a requester device 700.

Figure 7B:
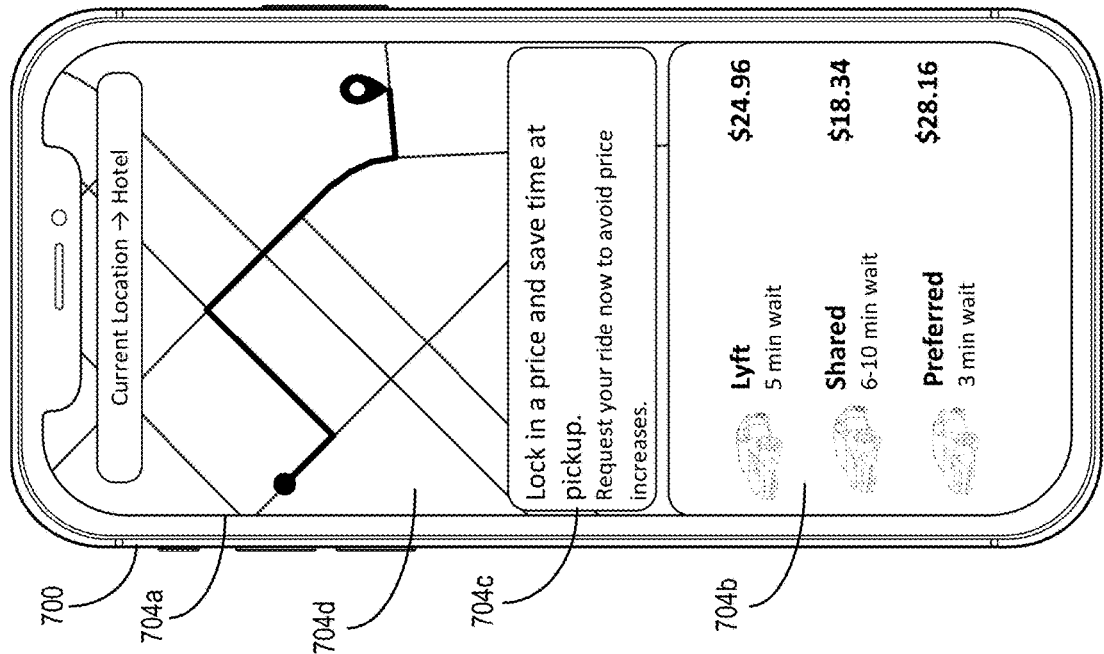
FIGS. 7A-7D illustrate a series of graphical user interfaces for requesting an event-trigger transportation match in accordance with one or more embodiments.
Figure 7A:
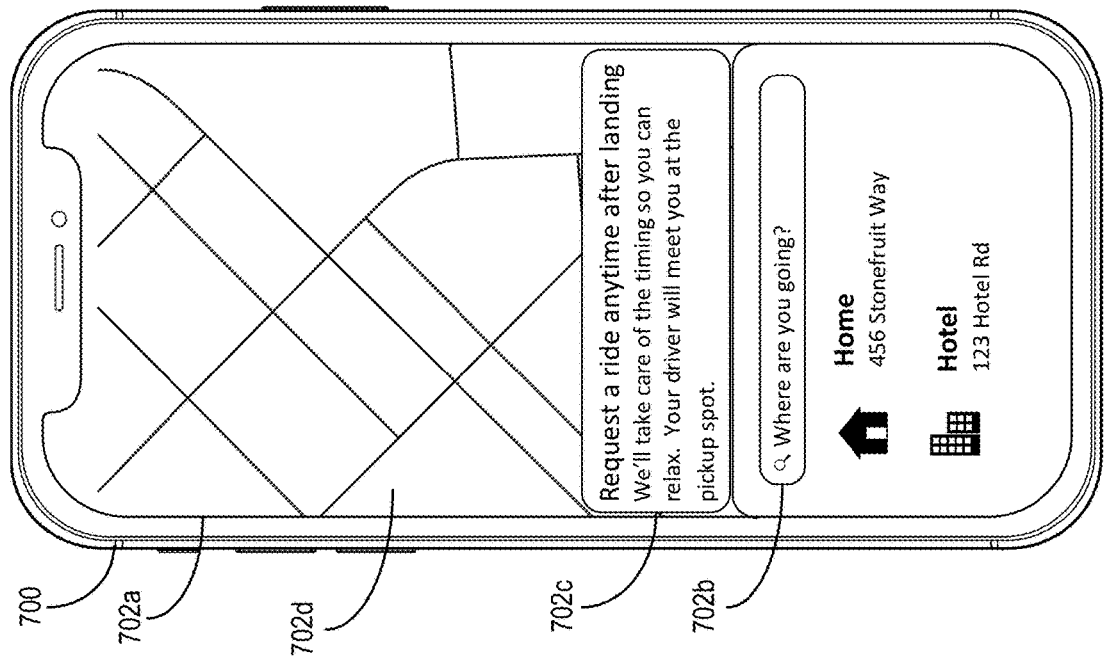

As shown on FIG. 7A, the event-trigger transportation matching system 106 displays (or provides, for display, via a requester computing device) a graphical user interface 702a which includes an input field 702b to select a pickup destination for an event-trigger transportation request. In one or more embodiments, as shown, the graphical user interface 702a includes a contextual notification 702c that informs the user that the requester device can request a ride any time after landing (to acknowledge completion of the future event). In one or more embodiments, the graphical user interface 702a also displays the contextual notification 702c that can include information regarding the selection of an event-trigger transportation match that can include information such as how the event-trigger transportation matching system 106 will dispatch a provider device to the pickup location without further user input (e.g., without user input of the requested time for the event-trigger transportation match pickup). As shown, the graphical user interface 702a displays a map 702d that shows the current location of the requester device, the pickup location, the event completion location, and/or areas on the route between the current location and the pickup location (the current location is shown on map 702d).

The event-trigger transportation system 106 can detect an event-trigger transportation request in a variety of ways. In some implementations (such as shown in FIG. 7A), the event-trigger transportation system 106 automatically determines an event and a corresponding event-trigger transportation request. For example, based on the current location of a requester computing device (e.g., at an airport terminal or traveling to an airport parking garage), the event-trigger transportation system 106 can determine that the requester device seeks an event-trigger transportation request. In response, the event-trigger transportation system 106 provides the contextual notification 702c.

In some embodiments, the event-trigger transportation system 106 provides a selectable option for the requester device to select an event-trigger transportation request. For example, the event-trigger transportation system 106 provides a radio button or toggle button for the requester device to select an event-trigger transportation request. The event-trigger transportation system 106 can also provide selectable options for a requester device to select an event (e.g., a flight that will land or a location that will trigger a transportation request).

As further shown in FIG. 7B, the event-trigger transportation matching system 106 displays a graphical user interface 704a which provides an input field 704b to select a provider device (e.g., size or type of rideshare) for an event-trigger transportation request. The graphical user interface 704a also displays contextual notification 704c such as how the event-trigger transportation matching system 106 will preselect the rideshare (e.g., lock in current selection, price guarantees, and features) without further user input after completion of the future event. Indeed, as shown, the event-trigger transportation matching system 106 can provide guarantees that the price will not significantly increase after the request or provide reduced pricing given the advanced time to identify a transportation match. As shown, the graphical user interface 704a displays a map 704d that shows the current location of the requester device, the pickup location, the event completion location, and/or areas on the route between the current location and the pickup location (the route between the event completion location and the destination location is shown on map 704d).

Figure 7D:
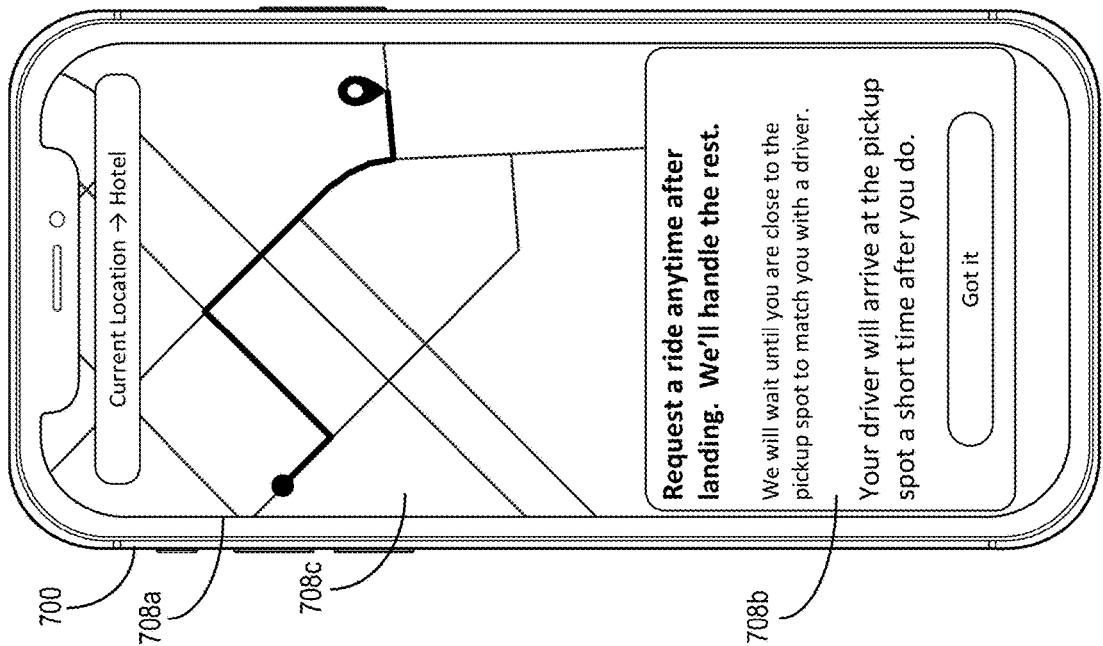
Figure 7C:
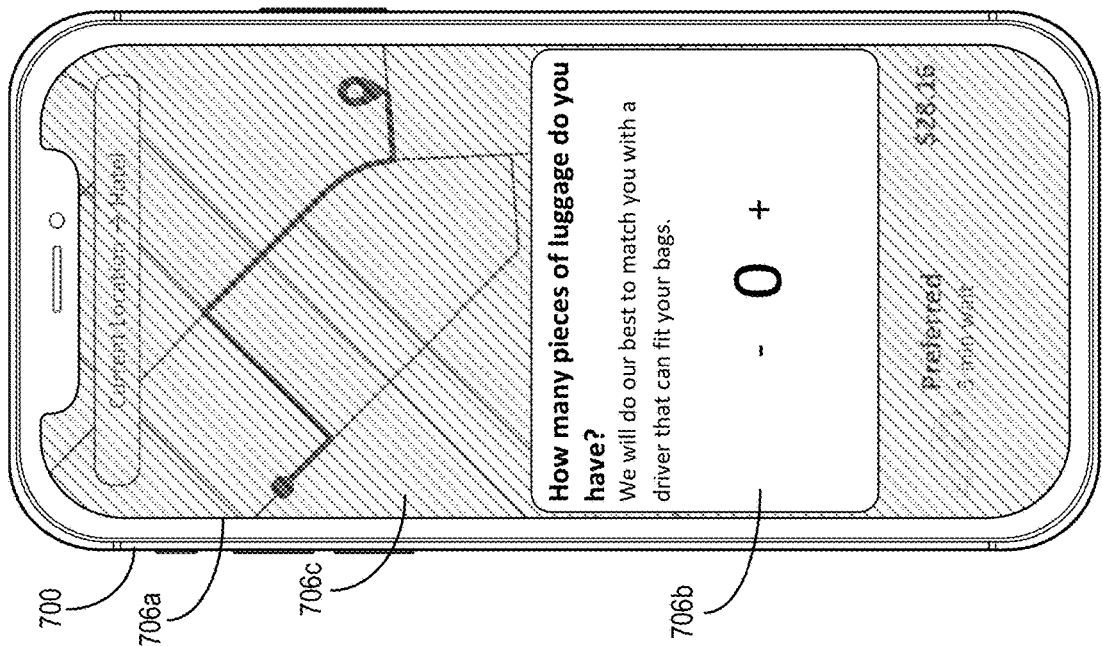

As shown on FIG. 7C, the event-trigger transportation matching system 106 displays a graphical user interface 706a which provides an input field 706b to select contextual information associated with an event-trigger transportation request. For example, as shown, the event-trigger transportation matching system 106 accepts input regarding the amount of luggage associated with the event-trigger transportation request. As another example, although not shown, the event-trigger transportation matching system 106 can accept input regarding the size of vehicle requested, a request for additional assistance at the pickup location, the urgency of the request (e.g., a priority request for faster pickup), the use of a child car seat, the need for a handicap accessible vehicle, or other contextual information. As shown, the graphical user interface 706a can display a map 706c that shows the current location of the requester device, the pickup location, the event completion location, and/or the areas on route between the current location and the pickup location (the route between the event completion location and the destination location is shown on map 706c). As shown, in graphical user interface 706a, the map 706c can be greyed out (or de-emphasized in another manner) while the user provides information for the input field 706b. Notably, although not shown, the event-trigger transportation matching system 106 can similarly grey out (or de-emphasize) parts of the graphical user interface 702a, 704a, 708a, 802a, 804a, 806a, and 808a.

As further shown on FIG. 7D, the event-trigger transportation matching system 106 displays a graphical user interface 708a which provides a section 708b displaying information about how the event-trigger transportation request is handled by the event-trigger transportation matching system 106. As shown, the graphical user interface 708a can display contextual notification explaining the system will dispatch a provider device to the pickup location once the requester device is close to the pickup spot and without further user input such as the requested time for the event-trigger transportation match pickup. As shown, the graphical user interface 708a displays a map 708c that shows the current location of the requester device, the pickup location, and/or areas on the route between the current location and the pickup location (the route between the event completion location and the destination location is shown on map 708c).

As discussed above, after the completion of the future event, the event-trigger transportation matching system 106 can seamlessly generate an event-trigger transportation match without further input from the requester device. FIGS. 8A-8D illustrate a series of graphical user interfaces coordinating arrival at the pickup location for the event-trigger transportation match in accordance with one or more embodiments. As shown in FIGS. 8A-8D, the event-trigger transportation matching system 106 may provide graphical user interfaces 802a, 804a, 806a, and 808a that can be displayed via a requester device 800.

Figure 8B:
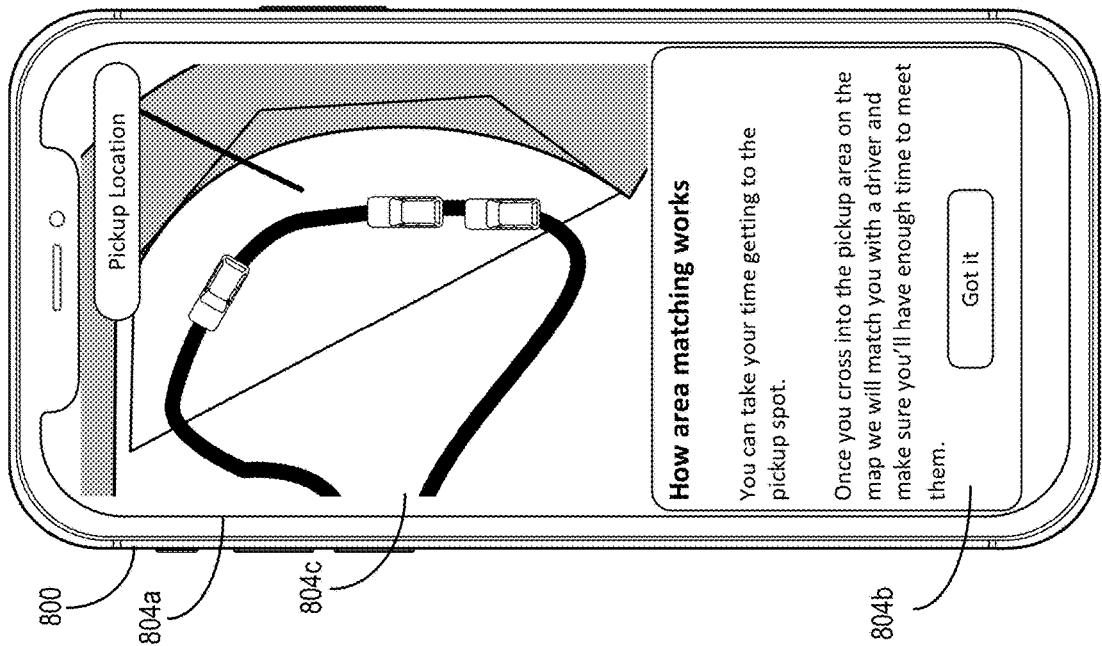
FIGS. 8A-8D illustrate a series of graphical user interfaces coordinating requester device arrival at the pickup location for the event-trigger transportation match in accordance with one or more embodiments.
Figure 8A:
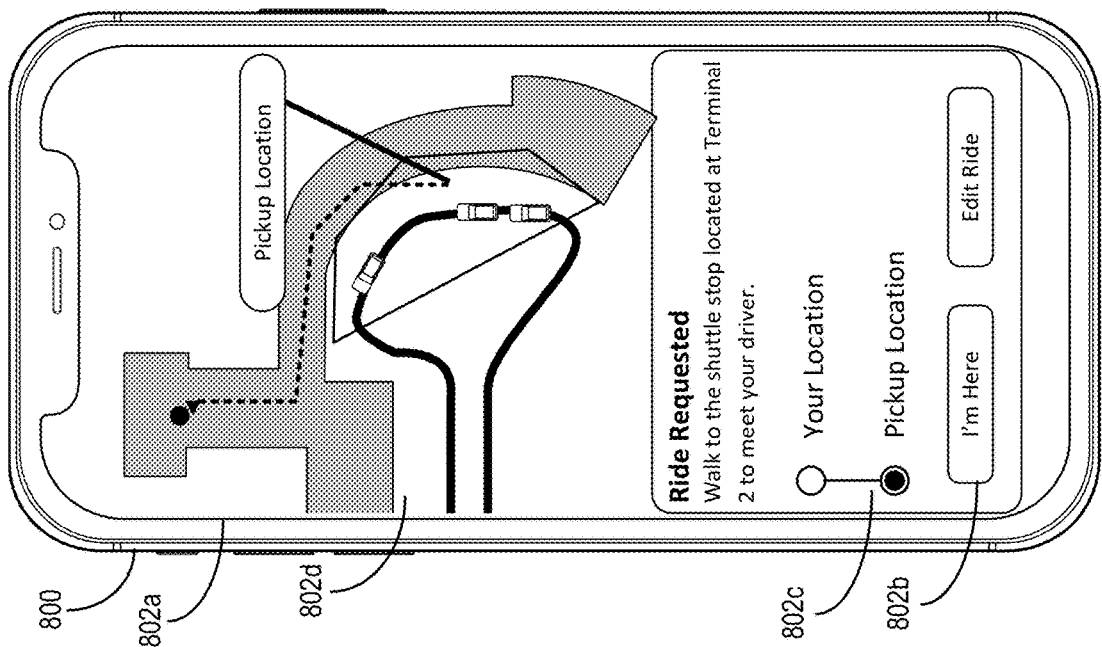

As shown on FIG. 8A, upon completion of the future event, the event-trigger transportation matching system 106 can display a graphical user interface 802a which provides an input field 802b to allow user input associated with the event-trigger transportation request. In particular, the requester device can provide an input selection on the user to accept updates to the event-trigger transportation request such as the type of ride, or other contextual features associated with the ride (e.g., vehicle size, special requests). Additionally, as shown, the input field 802b provides a selectable option to specify that the requester device has arrived at the pickup location (e.g., "I'm Here"). Indeed, the event-trigger transportation matching system 106 will match and dispatch a provider device based on the input field 802b that allows the requester device to override the location trigger. To illustrate, the user can select the "I'm Here" option if the GPS information is inaccurate or if a first requester device requested the ride for second requester device. Similarly, although not shown, the event-trigger transportation matching system 106 can provide an option on the graphical user interface 802a to delay an event-trigger transportation match. To illustrate, the event-trigger transportation matching system 106 can provide an input field such as "Are you ready?" that allows the requester device to override the location trigger and indicate a request to delay the transportation match (e.g., the requester device desires extra time before pickup).

Similarly, in one or more embodiments the event-trigger transportation matching system 106 can provide an input field such as "Early Match" that allows the requester device to request an early match. For example, the requester device can request an early match if the requester device will be moving directly to the pickup location, the requester device will be moving to the pickup location at an increased rate of speed, and/or the requester device is within a threshold ETA/distance of the pickup location. In particular, if at any point in the matching process, the requester device requests an early match, the event-trigger transportation matching system 106 can match and dispatch a provider device at an earlier time. For example, the event-trigger transportation matching system 106 can provide an early match by modifying the geofence boundary and/or modifying the requester device ETA.

The graphical user interface 802a also displays a contextual notification 802c that can include descriptive information and directions. In particular, the contextual notification 802c can include a notification that the event-trigger transportation matching system 106 will dispatch a provider device to the pickup location when the requester device approaches the pickup location (e.g., satisfies the location trigger). As shown, the contextual notification 802c can also include instructions/directions detailing steps for the requester device to follow to move to the pickup location (e.g., the area within the geofence indicator). As also shown, the graphical user interface 802a displays a map 802d that shows the current location of the requester device, the pickup location, the event completion location, and/or areas on the route between the current location and the pickup location (the route to the pickup location is shown in map 802d). As shown, the map 802d can include the current location of the requester device, a visual depiction of the geofence boundary (e.g., a geofence indicator), images of waiting provider vehicles, and an indication of the pickup location.

As further shown on FIG. 8B, the event-trigger transportation matching system 106 displays a graphical user interface 804a which provides an input field 804b that can display further information about how the event-trigger transportation request is handled by the event-trigger transportation matching system 106. As shown, the graphical user interface 804a also displays contextual notification explaining the system will dispatch a provider device to the pickup location once the requester device is close to the pickup location or when the requester device approaches the pickup location (as shown by the geofence boundary). As shown, the graphical user interface 804a also displays a map 804c that shows the current location of the requester device, the pickup location, the event completion location, and/or areas on the route between the current location and the pickup location (the geofence boundary is shown in map 804c). As shown, the map 804c can include a visual depiction of the geofence boundary, images of waiting provider vehicles, and an indication of the pickup location.

Figure 8D:
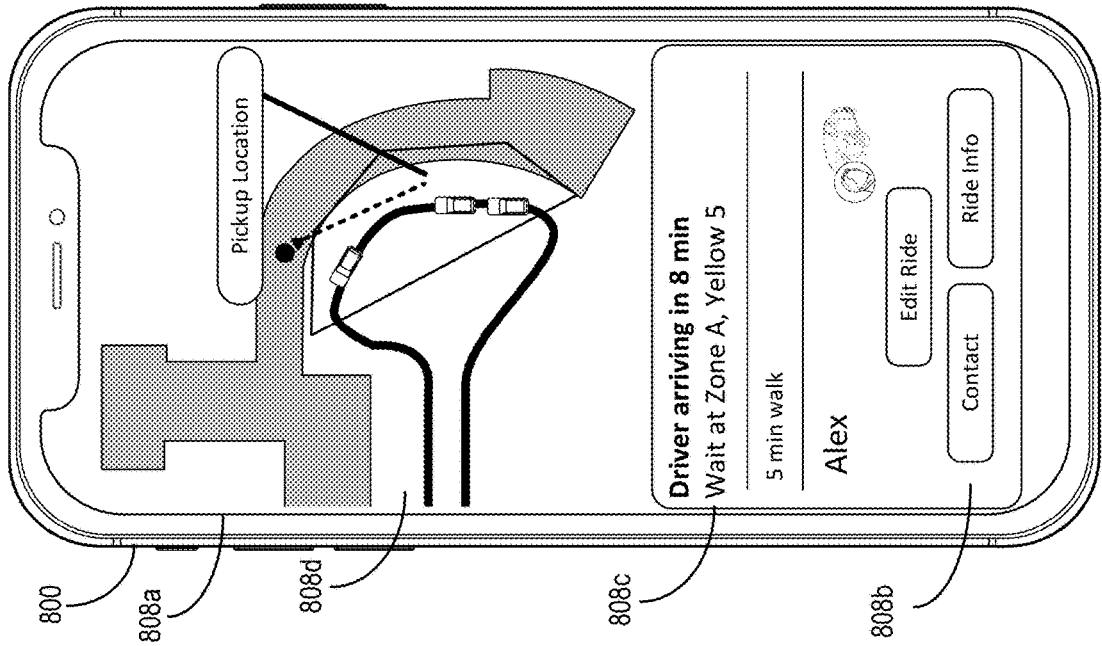
Figure 8C:
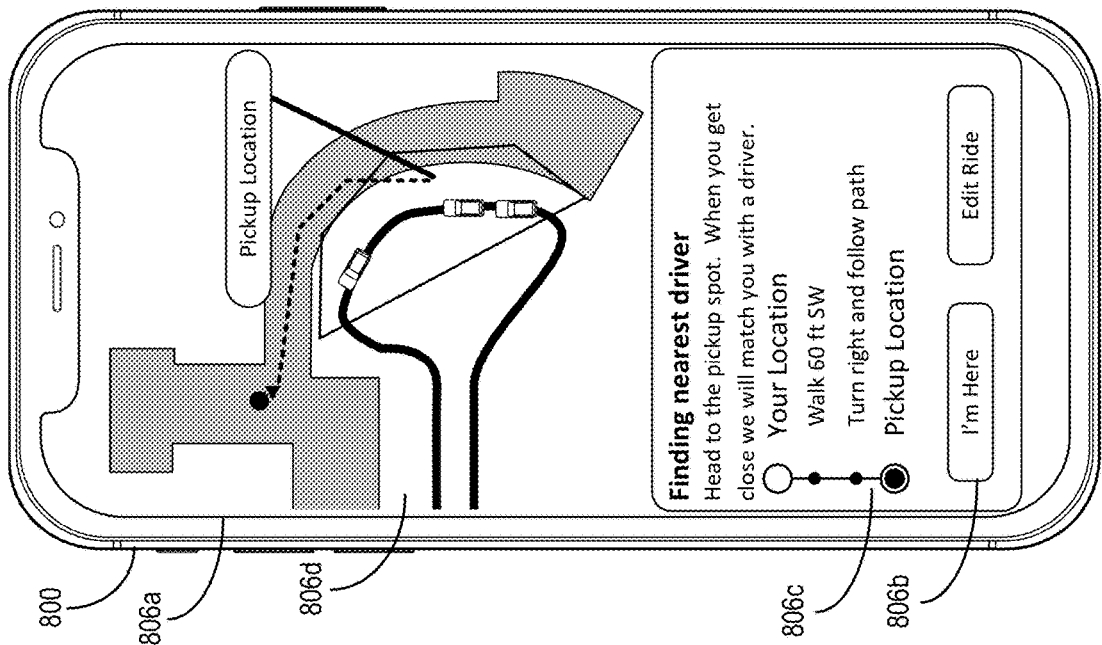

As shown on FIG. 8C, when the requester device satisfies the location trigger, the event-trigger transportation matching system 106 displays a graphical user interface 806a which includes an indication that the event-trigger transportation match is being generated. As shown, the graphical user interface 806a includes an input field 806b with selectable options (e.g., "Edit Ride" or "I'm Here") to update the event-trigger transportation request. As shown, the input field 806c includes an indication that a ride has been requested and additional contextual notifications and directions to the pickup location. The graphical user interface 806a also displays a map 806d that shows the current location of the requester device, the pickup location, the event completion location, and/or areas on the route between the current location and the pickup location. As shown, the map 804c can include a visual depiction of the geofence boundary, images of waiting provider vehicles, and an indication of the current location of the requester device.

As shown in FIG. 8D, when the event-trigger transportation matching system 106 matches a provider device with an event-trigger transportation request, the event-trigger transportation matching system 106 displays a graphical user interface 808a which includes an indication that the event-trigger transportation match has been generated. As shown, the graphical user interface 806a includes an input field 808b that can include selectable options to update the event-trigger transportation request, contact the provider device, or obtain further information regarding the event-trigger transportation match (e.g., "Edit Ride," "Contact," and "Ride Info"). The field 808c includes an indication that a provider device is on the way and additional contextual information, an estimated wait time, and directions to the pickup location. As shown, the graphical user interface 808a also displays a map 808d that can include the current location of the requester device, the pickup location, the event completion location, and/or areas on the route between the current location and the pickup location. As shown, the map 804c can include a visual depiction of the geofence boundary, images of waiting provider vehicles, the pickup location, and an indication of the current location of the requester device.

Although FIGS. 7A-7D, and 8A-8D illustrate a particular graphical user interface flow, the event-trigger transportation matching system 106 can utilize a variety of different approaches as described herein based on the embodiment of the event-trigger transportation matching system 106.

In one or more embodiments, each of the components of the event-trigger transportation matching system 106 are in communication with one another using any suitable communication technologies. Additionally, the components of the event-trigger transportation matching system 106 can be in communication with one or more other devices including one or more client devices described above. Furthermore, although the components of FIGS. 1-8D are described in connection with the event-trigger transportation matching system 106, at least some of the components for performing operations in conjunction with the event-trigger transportation matching system 106 described herein may be implemented on other devices within the environment.

The components of the event-trigger transportation matching system 106 can include software, hardware, or both. For example, the components of the event-trigger transportation matching system 106 can include one or more instructions stored on a computer-readable storage medium and executable by processors of one or more computing devices. When executed by the one or more processors, the computer-executable instructions of the event-trigger transportation matching system 106 can cause the computing device to perform the methods described herein. Alternatively, the components of the event-trigger transportation matching system 106 can comprise hardware, such as a special purpose processing device to perform a certain function or group of functions. Additionally or alternatively, the components of the event-trigger transportation matching system 106 can include a combination of computer-executable instructions and hardware.

Furthermore, the components of the event-trigger transportation matching system 106 performing the functions described herein may, for example, be implemented as part of a stand-alone application, as a module of an application, as a plug-in for applications including content management applications, as a library function or functions that may be called by other applications, and/or as a cloud-computing model. Thus, the components of the event-trigger transportation matching system 106 may be implemented as part of a stand-alone application on a personal computing device or a mobile device. Alternatively or additionally, the components of the event-trigger transportation matching system 106 may be implemented in any application that allows creation and delivery of marketing content to users, including, but not limited to, various applications.

FIGS. 1-8D, the corresponding text, and the examples provide a number of different systems, methods, and non-transitory computer readable media for selecting and providing a transportation request to a limited-eligibility provider device. In addition to the foregoing, embodiments can also be described in terms of flowcharts comprising acts for accomplishing a particular result. For example, FIG. 9 illustrates a flowchart of an example sequence of acts in accordance with one or more embodiments.

Figure 9:
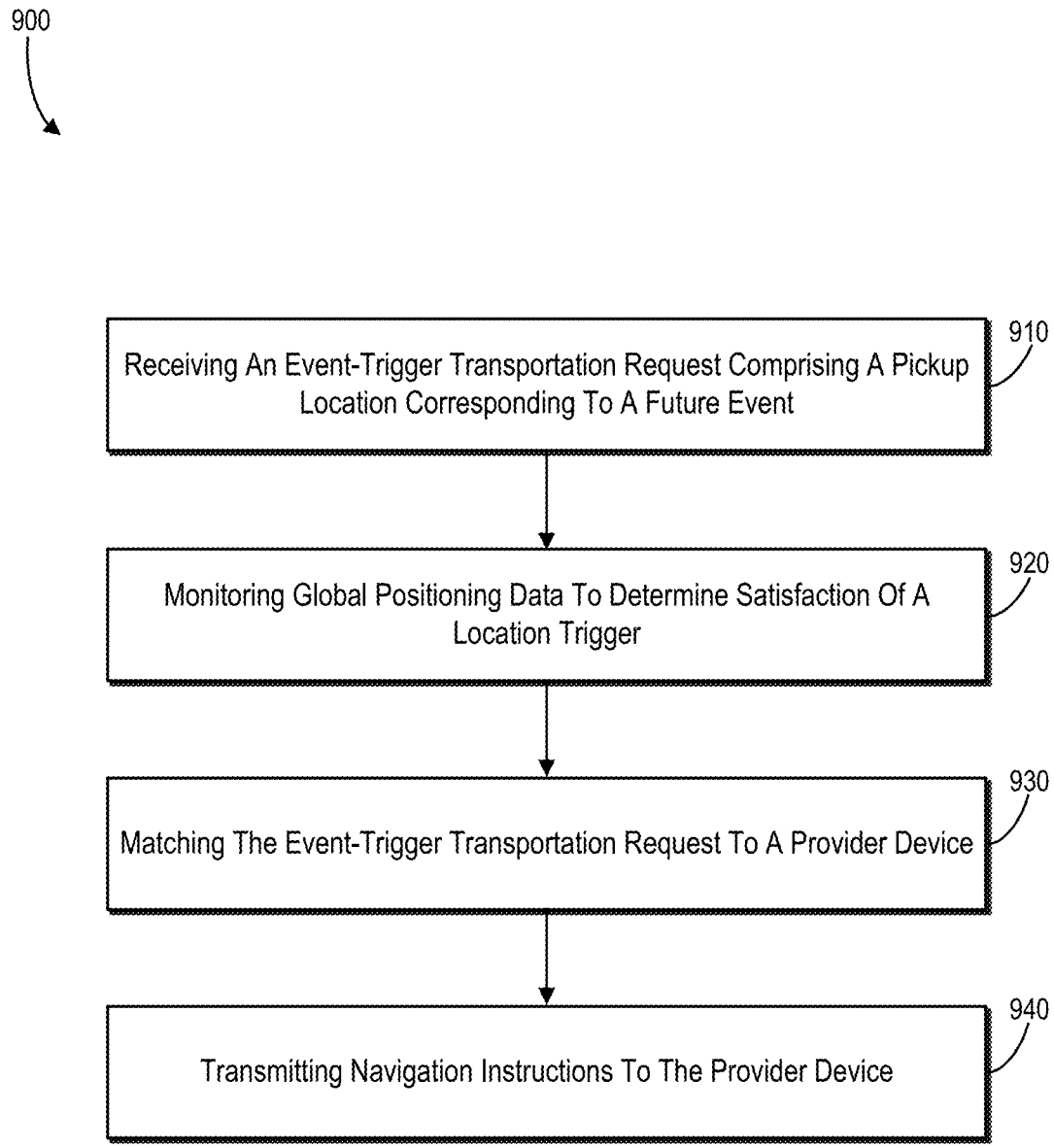
FIG. 9 illustrates an example series of acts for matching provider devices to event-trigger transportation requests in accordance with one or more embodiments.

While FIG. 9 illustrates acts according to some embodiments, alternative embodiments may omit, add to, reorder, and/or modify any of the acts shown in FIG. 9. The acts of FIG. 9 can be performed as part of a method. Alternatively, a non-transitory computer readable medium can comprise instructions, that when executed by one or more processors, cause a computing device to perform the acts of FIG. 9. In still further embodiments, a system can perform the acts of FIG. 9. Additionally, the acts described herein may be repeated or performed in parallel with one another or in parallel with different instances of the same or other similar acts.

FIG. 9 illustrates an example series of acts 900 for matching provider devices to event-trigger transportation requests in accordance with one or more embodiments. As shown, the series of acts 900 includes an act 910 of receiving an event-trigger transportation request comprising a pickup location corresponding to a future event, an act 920 of monitoring global positioning data to determine satisfaction of a location trigger, an act 930 of matching the event-trigger transportation request to a provider device, an act 940 of transmitting navigation instructions to the provider device.

For example, in one or more implementations the acts 910-940 include: receiving, from a requester device, an event-trigger transportation request comprising a pickup location corresponding to a future event; upon determining that the future event has occurred, monitoring global positioning data of the requester device to determine that the requester device satisfies a location trigger corresponding to the pickup location; based on determining that the requester device satisfies the location trigger, matching the event-trigger transportation request to a provider device from a pool of available provider devices to assign to the event-trigger transportation request; and transmitting navigation instructions to the provider device to transport the requester device from the pickup location.

In one or more implementations, the series of acts 900 also includes identifying the future event based on at least one of a location of the requester device or the pickup location; and in response to identifying the future event, providing a future event indicator via a user interface of the requester device. Furthermore, in some implementations, the series of acts 900 includes upon detecting that the future event has occurred, providing via a user interface of the requester device, a geofence indicator associated with the pickup location; and providing, via the user interface of the requester device, an indication for the requester device to move to a geographic area within the geofence indicator.

In one or more implementations, the series of acts 900 includes determining a geofence boundary around the pickup location; and determining the requester device satisfies the location trigger by determining, based on GPS information of the requester device, the requester device is within the geofence boundary. Moreover, in some implementations, the series of acts 900 includes determining that the requester device satisfies the location trigger wherein determining that the requester device satisfies the location trigger comprises comparing a requester device ETA to the pickup location with a threshold ETA. Further, in one or more implementations, the series of acts 900 includes determining the requester device ETA to the pickup location based on a current location of the requester device and contextual transportation features corresponding to the requester device.

Furthermore, in some implementations, the series of acts 900 includes determining a number of provider devices in the pool of available provider devices corresponding to the pickup location; and selecting a requester device ETA as the location trigger from a plurality of location triggers based on the number of provider devices. In addition, in some implementations, the series of acts 900 includes selecting a requester device ETA as the location trigger based on determining a provider device requester device balance metric corresponding to the pickup location; and selecting the requester device ETA as the location trigger based on the provider device requester device balance metric. In one or more implementations, the series of acts 900 includes matching the event-trigger transportation request to a provider device from a pool of available provider devices based on determining a number of available provider devices from the pool of available provider devices within a pickup location threshold; and pre-dispatching one or more provider devices based on the event-trigger transportation request and the number of available provider devices.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system, including by one or more servers. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, virtual reality devices, personal computers, desktop computers, laptop computers, message processors, hand-held devices, multi-processor systems, microprocessor-based or programmable consumer electronics, network PCs, mini-computers, mainframe computers, mobile telephones, PDAS, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 10:
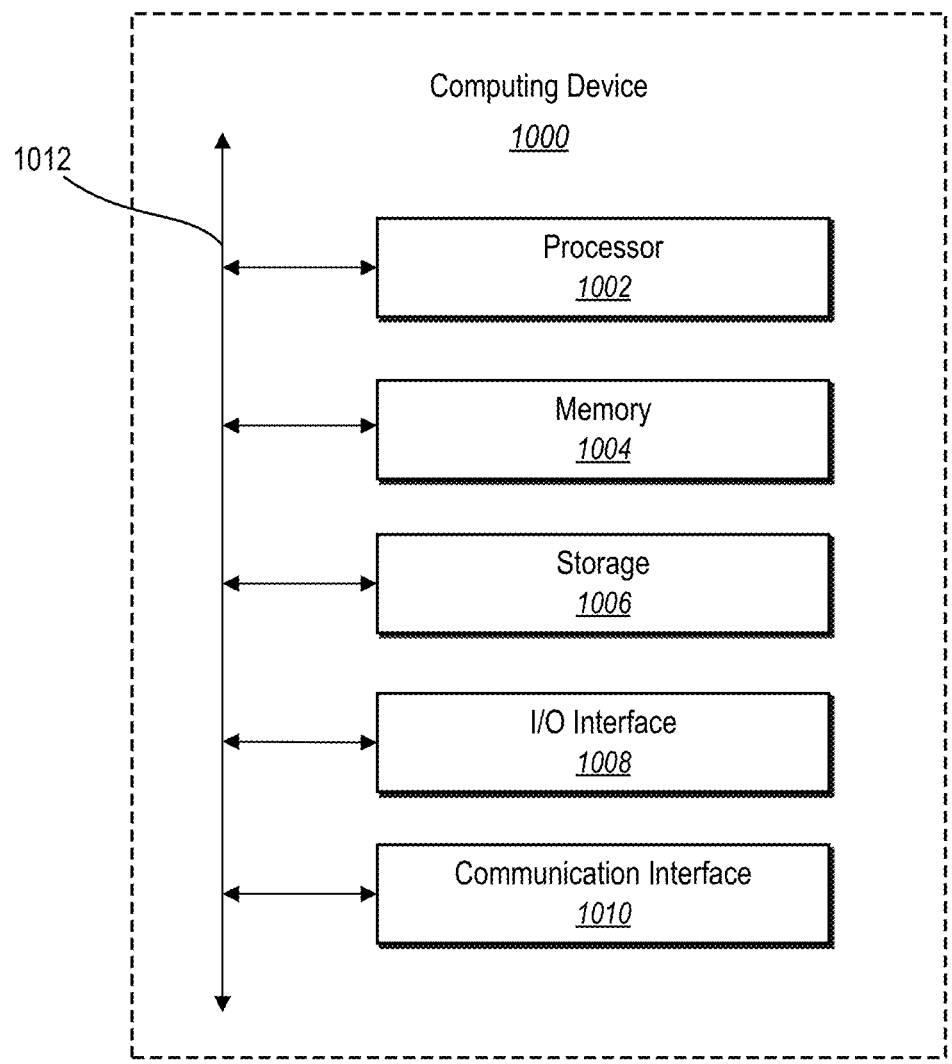
FIG. 10 illustrates a block diagram of a computing device for implementing one or more embodiments of the present disclosure.

FIG. 10 illustrates, in block diagram form, an exemplary computing device 1000 (e.g., the provider device(s) 122, the requester device(s) 112, or the server(s) 102) that may be configured to perform one or more of the processes described above. One will appreciate that the event-trigger transportation matching system 106 can comprise implementations of the computing device 1000, including, but not limited to, the provider device(s) 122 and/or the server(s) 102. As shown by FIG. 10, the computing device can comprise a processor 1002, memory 1004, a storage device 1006, an I/O interface 1008, and a communication interface 1010. In certain embodiments, the computing device 1000 can include fewer or more components than those shown in FIG. 10. Components of computing device 1000 shown in FIG. 10 will now be described in additional detail.

In particular embodiments, processor(s) 1002 includes hardware for executing instructions, such as those making up a computer program. As an example, and not by way of limitation, to execute instructions, processor(s) 1002 may retrieve (or fetch) the instructions from an internal register, an internal cache, memory 1004, or a storage device 1006 and decode and execute them.

The computing device 1000 includes memory 1004, which is coupled to the processor(s) 1002. The memory 1004 may be used for storing data, metadata, and programs for execution by the processor(s). The memory 1004 may include one or more of volatile and non-volatile memories, such as Random Access Memory ("RAM"), Read Only Memory ("ROM"), a solid-state disk ("SSD"), Flash, Phase Change Memory ("PCM"), or other types of data storage. The memory 1004 may be internal or distributed memory.

The computing device 1000 includes a storage device 1006 includes storage for storing data or instructions. As an example, and not by way of limitation, storage device 1006 can comprise a non-transitory storage medium described above. The storage device 1006 may include a hard disk drive ("HDD"), flash memory, a Universal Serial Bus ("USB") drive or a combination of these or other storage devices.

The computing device 1000 also includes one or more input or output interface 1008 (or "I/O interface 1008"), which are provided to allow a user (e.g., requester or provider) to provide input to (such as user strokes), receive output from, and otherwise transfer data to and from the computing device 1000. The I/O interface 1008 may include a mouse, keypad or a keyboard, a touch screen, camera, optical scanner, network interface, modem, other known I/O devices or a combination of such I/O interface 1008. The touch screen may be activated with a stylus or a finger.

The I/O interface 1008 may include one or more devices for presenting output to a user, including, but not limited to, a graphics engine, a display (e.g., a display screen), one or more output providers (e.g., display providers), one or more audio speakers, and one or more audio providers. In certain embodiments, interface 1008 is configured to provide graphical data to a display for presentation to a user. The graphical data may be representative of one or more graphical user interfaces and/or any other graphical content as may serve a particular implementation.

The computing device 1000 can further include a communication interface 1010. The communication interface 1010 can include hardware, software, or both. The communication interface 1010 can provide one or more interfaces for communication (such as, for example, packet-based communication) between the computing device and one or more other computing devices 1000 or one or more networks. As an example, and not by way of limitation, communication interface 1010 may include a network interface controller ("NIC") or network adapter for communicating with an Ethernet or other wire-based network or a wireless NIC ("WNIC") or wireless adapter for communicating with a wireless network, such as a WI-FI. The computing device 1000 can further include a bus 1012. The bus 1012 can comprise hardware, software, or both that connects components of computing device 1000 to each other.

Figure 11:
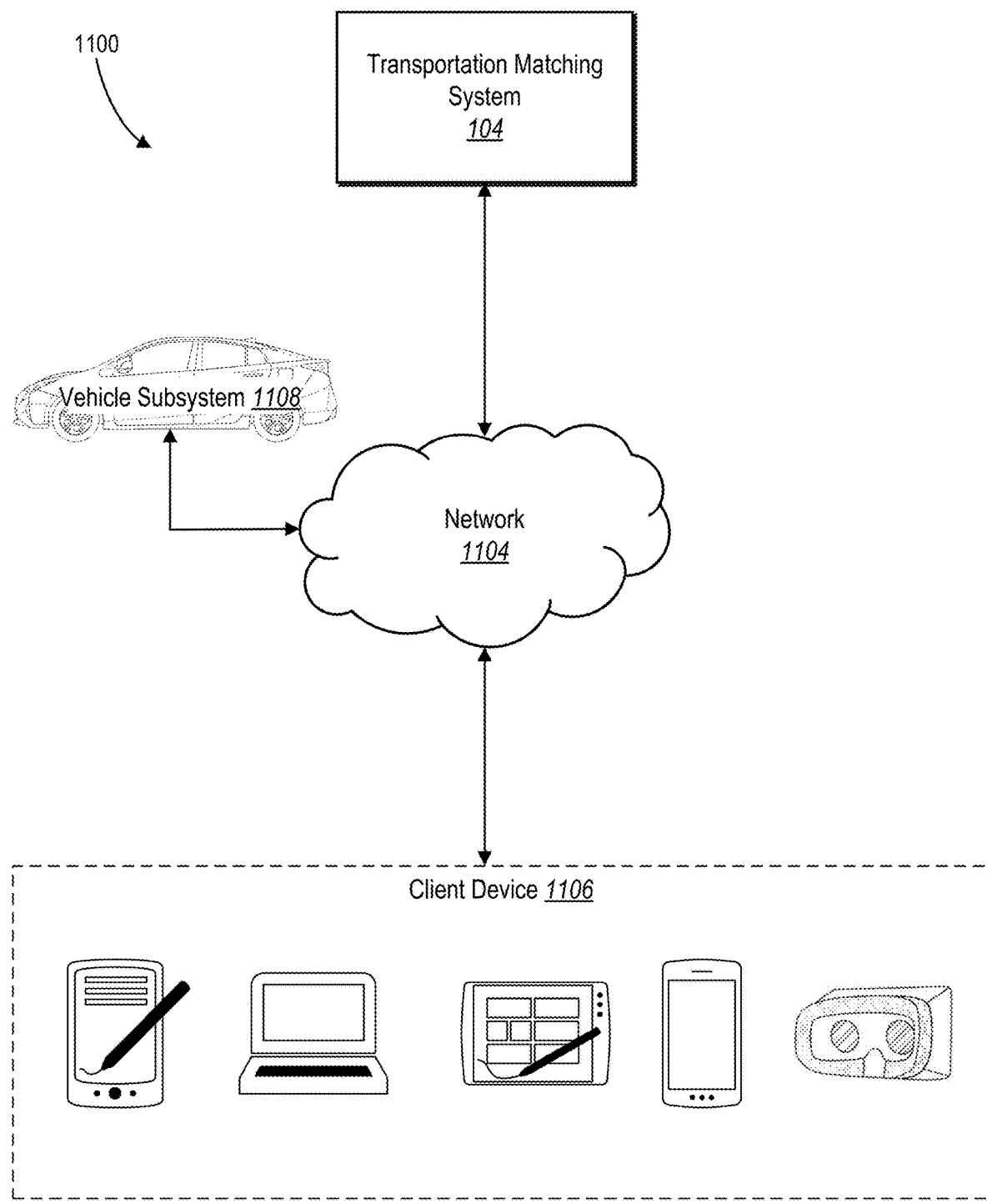
FIG. 11 illustrates an example environment for a transportation matching system in accordance with one or more embodiments.

FIG. 11 illustrates an example network environment 1100 of the transportation matching system 104. The network environment 1100 includes a client device 1106 (e.g., the provider device(s) 122 or the requester device(s) 112), a transportation matching system 104, and a vehicle subsystem 1108 connected to each other by a network 1104. Although FIG. 11 illustrates a particular arrangement of the client device 1106, the transportation matching system 104, the vehicle subsystem 1108, and the network 1104, this disclosure contemplates any suitable arrangement of client device 1106, the transportation matching system 104, the vehicle subsystem 1108, and the network 1104. As an example, and not by way of limitation, two or more of client device 1106, the transportation matching system 104, and the vehicle subsystem 1108 communicate directly, bypassing network 1104. As another example, two or more of client device 1106, the transportation matching system 104, and the vehicle subsystem 1108 may be physically or logically co-located with each other in whole or in part.

Moreover, although FIG. 11 illustrates a particular number of client devices 1106, transportation matching systems 104, vehicle subsystems 1108, and networks 1104, this disclosure contemplates any suitable number of client devices 1106, transportation matching system 104, vehicle subsystems 1108, and networks 1104. As an example, and not by way of limitation, network environment 1100 may include multiple client devices 1106, transportation matching system 104, vehicle subsystems 1108, and/or networks 1104.

This disclosure contemplates any suitable network 1104. As an example, and not by way of limitation, one or more portions of network 1104 may include an ad hoc network, an intranet, an extranet, a virtual private network ("VPN"), a local area network ("LAN"), a wireless LAN ("WLAN"), a wide area network ("WAN"), a wireless WAN ("WWAN"), a metropolitan area network ("MAN"), a portion of the Internet, a portion of the Public Switched Telephone Network ("PSTN"), a cellular telephone network, or a combination of two or more of these. Network 1104 may include one or more networks 1104.

Links may connect client device 1106, event-trigger transportation matching system 106, and vehicle subsystem 1108 to network 1104 or to each other. This disclosure contemplates any suitable links. In particular embodiments, one or more links include one or more wireline (such as for example Digital Subscriber Line ("DSL") or Data Over Cable Service Interface Specification ("DOCSIS"), wireless (such as for example Wi-Fi or Worldwide Interoperability for Microwave Access ("WiMAX"), or optical (such as for example Synchronous Optical Network ("SONET") or Synchronous Digital Hierarchy ("SDH") links. In particular embodiments, one or more links each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link, or a combination of two or more such links. Links need not necessarily be the same throughout network environment 1100. One or more first links may differ in one or more respects from one or more second links.

In particular embodiments, the client device 1106 may be an electronic device including hardware, software, or embedded logic components or a combination of two or more such components and capable of carrying out the appropriate functionalities implemented or supported by client device 1106. As an example, and not by way of limitation, a client device 1106 may include any of the computing devices discussed above in relation to FIG. 10. A client device 1106 may enable a network user at the client device 1106 to access network 1104. A client device 1106 may enable its user to communicate with other users at other client devices 1106.

In particular embodiments, the client device 1106 may include a requester application or a web browser, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at the client device 1106 may enter a Uniform Resource Locator ("URL") or other address directing the web browser to a particular server (such as server), and the web browser may generate a Hyper Text Transfer Protocol ("HTTP") request and communicate the HTTP request to server. The server may accept the HTTP request and communicate to the client device 1106 one or more Hyper Text Markup Language ("HTML") files responsive to the HTTP request. The client device 1106 may render a webpage based on the HTML files from the server for presentation to the user. This disclosure contemplates any suitable webpage files. As an example, and not by way of limitation, webpages may render from HTML files, Extensible Hyper Text Markup Language ("XHTML") files, or Extensible Markup Language ("XML") files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, transportation matching system 104 may be a network-addressable computing system that can host a transportation matching network. The transportation matching system 104 may generate, store, receive, and send data, such as, for example, user-profile data, concept-profile data, text data, transportation request data, GPS location data, provider data, requester data, vehicle data, or other suitable data related to the transportation matching network. This may include authenticating the identity of providers and/or vehicles who are authorized to provide transportation services through the transportation matching system 104. In addition, the transportation matching system 104 may manage identities of service requesters such as users/requesters. In particular, the transportation matching system 104 may maintain requester data such as driving/riding histories, personal data, or other user data in addition to navigation and/or traffic management services or other location services (e.g., GPS services).

In particular embodiments, the transportation matching system 104 may manage transportation matching services to connect a user/requester with a vehicle and/or provider. By managing the transportation matching services, the transportation matching system 104 can manage the distribution and allocation of resources from vehicle systems and user resources such as GPS location and availability indicators, as described herein.

The transportation matching system 104 may be accessed by the other components of network environment 1100 either directly or via network 1104. In particular embodiments, the transportation matching system 104 may include one or more servers. Each server may be a unitary server or a distributed server spanning multiple computers or multiple datacenters. Servers may be of various types, such as, for example and without limitation, web server, news server, mail server, message server, advertising server, file server, application server, exchange server, database server, proxy server, another server suitable for performing functions or processes described herein, or any combination thereof. In particular embodiments, each server may include hardware, software, or embedded logic components or a combination of two or more such components for carrying out the appropriate functionalities implemented or supported by server. In particular embodiments, the transportation matching system 104 may include one or more data stores. Data stores may be used to store various types of information. In particular embodiments, the information stored in data stores may be organized according to specific data structures. In particular embodiments, each data store may be a relational, columnar, correlation, or other suitable database. Although this disclosure describes or illustrates particular types of databases, this disclosure contemplates any suitable types of databases. Particular embodiments may provide interfaces that enable a client device 1106, or a transportation matching system 104 to manage, retrieve, modify, add, or delete, the information stored in data store.

In particular embodiments, the transportation matching system 104 may provide users with the ability to take actions on various types of items or objects, supported by the transportation matching system 104. As an example, and not by way of limitation, the items and objects may include transportation matching networks to which users of the transportation matching system 104 may belong, vehicles that users may request, location designators, computer-based applications that a user may use, transactions that allow users to buy or sell items via the service, interactions with advertisements that a user may perform, or other suitable items or objects. A user may interact with anything that is capable of being represented in the transportation matching system 104 or by an external system of a third-party system, which is separate from transportation matching system 104 and coupled to the transportation matching system 104 via a network 1104.

In particular embodiments, the transportation matching system 104 may be capable of linking a variety of entities. As an example, and not by way of limitation, the transportation matching system 104 may enable users to interact with each other or other entities, or to allow users to interact with these entities through an application programming interfaces ("API") or other communication channels.

In particular embodiments, the transportation matching system 104 may include a variety of servers, sub-systems, programs, modules, logs, and data stores. In particular embodiments, the transportation matching system 104 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile (e.g., provider profile or requester profile) store, connection store, third-party content store, or location store. The transportation matching system 104 may also include suitable components such as network interfaces, security mechanisms, load balancers, failover servers, management-and-network-operations consoles, other suitable components, or any suitable combination thereof. In particular embodiments, the transportation matching system 104 may include one or more user-profile stores for storing user profiles for transportation providers and/or transportation requesters. A user profile may include, for example, biographic information, demographic information, behavioral information, social information, or other types of descriptive information, such as interests, affinities, or location.

The web server may include a mail server or other messaging functionality for receiving and routing messages between the transportation matching system 104 and one or more client devices 1106. An action logger may be used to receive communications from a web server about a user's actions on or off the transportation matching system 104. In conjunction with the action log, a third-party-content-object log may be maintained of user exposures to third-party-content objects. A notification controller may provide information regarding content objects to a client device 1106. Information may be pushed to a client device 1106 as notifications, or information may be pulled from client device 1106 responsive to a request received from client device 1106. Authorization servers may be used to enforce one or more privacy settings of the users of the transportation matching system 104. A privacy setting of a user determines how particular information associated with a user can be shared. The authorization server may allow users to opt in to or opt out of having their actions logged by the transportation matching system 104 or shared with other systems, such as, for example, by setting appropriate privacy settings. Third-party-content-object stores may be used to store content objects received from third parties. Location stores may be used for storing location information received from client devices 1106 associated with users.

In addition, the vehicle subsystem 1108 can include a human-operated vehicle or an autonomous vehicle. A provider of a human-operated vehicle can perform maneuvers to pick up, transport, and drop off one or more requesters according to the embodiments described herein. In certain embodiments, the vehicle subsystem 1108 can include an autonomous vehicle—e.g., a vehicle that does not require a human operator. In these embodiments, the vehicle subsystem 1108 can perform maneuvers, communicate, and otherwise function without the aid of a human provider, in accordance with available technology.

In particular embodiments, the vehicle subsystem 1108 may include one or more sensors incorporated therein or associated thereto. For example, sensor(s) can be mounted on the top of the vehicle subsystem 1108 or else can be located within the interior of the vehicle subsystem 1108. In certain embodiments, the sensor(s) can be located in multiple areas at once—e.g., split up throughout the vehicle subsystem 1108 so that different components of the sensor(s) can be placed in different locations in accordance with optimal operation of the sensor(s). In these embodiments, the sensor(s) can include motion-related components such as an inertial measurement unit ("IMU") including one or more accelerometers, one or more gyroscopes, and one or more magnetometers. The sensor(s) can additionally or alternatively include a wireless IMU ("WIMU"), one or more cameras, one or more microphones, or other sensors or data input devices capable of receiving and/or recording information relating to navigating a route to pick up, transport, and/or drop off a requester.

In particular embodiments, the vehicle subsystem 1108 may include a communication device capable of communicating with the client device 1106 and/or the event-trigger transportation matching system 106. For example, the vehicle subsystem 1108 can include an on-board computing device communicatively linked to the network 1104 to transmit and receive data such as GPS location information, sensor-related information, requester location information, or other relevant information.

In the foregoing specification, the invention has been described with reference to specific exemplary embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A computer-implemented method comprising:
   receiving, from a requester device, an event-trigger transportation request comprising a pickup location corresponding to a future event;
   upon determining that the future event has occurred, selecting a location trigger associated with a movement of the requester device to within a threshold of the pickup location;
   monitoring global positioning data of the requester device to determine that the requester device satisfies the location trigger by moving within a threshold of the pickup location; and
   based on determining that the requester device satisfies the location trigger:
   matching the event-trigger transportation request to a provider device from a pool of available provider devices, wherein the provider device corresponds to a transportation vehicle; and
   in response to transmitting navigation instructions to the provider device, navigating the transportation vehicle to the pickup location to transport the requester device from the pickup location.

2. The computer-implemented method of claim 1, further comprising:
   identifying the future event based on at least one of a location of the requester device or the pickup location; and
   in response to identifying the future event, providing a future event indicator via a user interface of the requester device.

3. The computer-implemented method of claim 1, further comprising:
   upon detecting that the future event has occurred, providing via a user interface of the requester device, a geofence indicator associated with the pickup location; and
   providing, via the user interface of the requester device, an indication for the requester device to move to a geographic area within the geofence indicator.

4. The computer-implemented method of claim 1, further comprising:
   determining a geofence boundary around the pickup location; and
   determining the requester device satisfies the location trigger by determining, based on GPS information of the requester device, the requester device is within the geofence boundary.

5. The computer-implemented method of claim 1, wherein navigating the transportation vehicle to the pickup location comprises navigating the transportation vehicle by transmitting navigation instructions comprising the pickup location to the provider device of a driver.

6. The computer-implemented method of claim 1, wherein determining that the requester device satisfies the location trigger comprises comparing a requester device ETA to the pickup location with a threshold, and further comprising determining the requester device ETA to the pickup location based on a current location of the requester device and contextual transportation features corresponding to the requester device.

7. The computer-implemented method of claim 1, further comprising:
   determining a number of provider devices in the pool of available provider devices corresponding to the pickup location; and
   selecting a requester device ETA as the location trigger from a plurality of location triggers based on the number of provider devices.

8. The computer-implemented method of claim 7, wherein selecting the requester device ETA as the location trigger based on the number of provider devices further comprises:
   determining a provider device requester device balance metric corresponding to the pickup location; and
   selecting the requester device ETA as the location trigger based on the provider device requester device balance metric.

9. The computer-implemented method of claim 1, wherein matching the event-trigger transportation request to a provider device from a pool of available provider devices further comprises:
   determining a number of available provider devices from the pool of available provider devices within a pickup location threshold; and
   pre-dispatching one or more provider devices based on the event-trigger transportation request and the number of available provider devices.

10. A system comprising:
    at least one processor; and
    a non-transitory computer readable storage medium comprising instructions that, when executed by the at least one processor, cause the system to:
    receive, from a requester device, an event-trigger transportation request comprising a pickup location corresponding to a future event;
    upon determining that the future event has occurred, select a location trigger associated with a movement of the requester device to within a threshold of the pickup location;
    monitor global positioning data of the requester device to determine that the requester device satisfies the location trigger by moving within a threshold of the pickup location; and
    based on determining that the requester device satisfies the location trigger:

match the event-trigger transportation request to a provider device from a pool of available provider devices to assign to the event-trigger transportation request, wherein the provider device corresponds to a transportation vehicle; and based on transmitting navigation instructions to the provider device, navigating the transportation vehicle to the pickup location to transport the requester device from the pickup location.

11. The system of claim 10, further comprising instructions that, when executed by the at least one processor, cause the system to:

identify the future event based on at least one of a location of the requester device or the pickup location; and in response to identifying the future event, provide a future event indicator via a user interface of the requester device.

12. The system of claim 10, further comprising instructions that, when executed by the at least one processor, cause the system to:

upon detecting that the future event has occurred, provide via a user interface of the requester device, a geofence indicator associated with the pickup location; and provide, via the user interface of the requester device, an indication for the requester device to move to a geographic area within the geofence indicator.

13. The system of claim 10, further comprising instructions that, when executed by the at least one processor, cause the system to:

determine a geofence boundary around the pickup location; and determine the requester device satisfies the location trigger by determining, based on GPS information of the requester device, the requester device is within the geofence boundary.

14. The system of claim 10, wherein determining that the requester device satisfies the location trigger comprises comparing a requester device ETA to the pickup location with a threshold ETA.

15. The system of claim 10, further comprising instructions that, when executed by the at least one processor, cause the system to:

determine a number of provider devices in the pool of available provider devices corresponding to the pickup location; and select a requester device ETA as the location trigger from a plurality of location triggers based on the number of provider devices.

16. The system of claim 14, wherein navigating the transportation vehicle to the pickup location comprises navigating the transportation vehicle by transmitting navigation instructions comprising the pickup location to the provider device of a driver.

17. A non-transitory computer readable storage medium comprising instructions that, when executed by at least one processor, cause the at least one processor to:

receive, from a requester device, an event-trigger transportation request comprising a pickup location corresponding to a future event;

upon determining that the future event has occurred, select a location trigger associated with a movement of the requester device to within a threshold of the pickup location;

monitor global positioning data of the requester device to determine that the requester device satisfies a location trigger corresponding to the pickup location; and based on determining that the requester device satisfies the location trigger:

match the event-trigger transportation request to a provider device from a pool of available provider devices to assign to the event-trigger transportation request, wherein the provider device corresponds to a transportation vehicle; and based on transmitting navigation instructions to the provider device transportation navigating the transportation vehicle to the pickup location to transport the requester device from the pickup location.

18. The non-transitory computer readable storage medium of claim 17, further comprising instructions that, when executed by the at least one processor, cause the at least one processor to:

identify the future event based on at least one of a location of the requester device or the pickup location; and in response to identifying the future event, provide a future event indicator via a user interface of the requester device.

19. The non-transitory computer readable storage medium of claim 17, further comprising instructions that, when executed by the at least one processor, cause the at least one processor to:

determine a geofence boundary around the pickup location; and determine the requester device satisfies the location trigger by determining, based on GPS information of the requester device, the requester device is within the geofence boundary.

20. The non-transitory computer readable storage medium of claim 17, further comprising instructions that, when executed by the at least one processor, cause the at least one processor to:

determine a number of provider devices in the pool of available provider devices corresponding to the pickup location; and select a requester device ETA as the location trigger from a plurality of location triggers based on the number of provider devices.

* * * * *